United States Patent
Shperling et al.

(10) Patent No.: US 9,209,889 B2
(45) Date of Patent: Dec. 8, 2015

(54) LTE CONCENTRATOR AND DISTRIBUTOR SYSTEM AND METHOD FOR COVERAGE EXTENSION

(71) Applicant: MOTOROLA SOLUTIONS, INC., Schaumburg, IL (US)

(72) Inventors: Itzhak Shperling, Bnei-Brak (IL); Amiram Frish, Givatim (IL); Guy Holtzman, Tel Aviv (IL); Eitan Koren, Raanana (IL); Abraham Tooba, Rishon Lezion (IL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 122 days.

(21) Appl. No.: 14/042,191

(22) Filed: Sep. 30, 2013

(65) Prior Publication Data
US 2015/0092660 A1    Apr. 2, 2015

(51) Int. Cl.
  *H04B 7/155*    (2006.01)
(52) U.S. Cl.
  CPC .................................. *H04B 7/15507* (2013.01)
(58) Field of Classification Search
  CPC .............. H04W 24/00; H04W 72/042; H04W 72/0426
  See application file for complete search history.

(56) References Cited

U.S. PATENT DOCUMENTS

| | | | |
|---|---|---|---|
| 5,644,599 A | 7/1997 | Hess | |
| 6,205,133 B1 | 3/2001 | Bexten | |
| 6,321,086 B1 | 11/2001 | Thurston et al. | |
| 6,381,466 B1 | 4/2002 | Sarallo et al. | |
| 7,830,832 B2 | 11/2010 | Young | |
| 8,139,529 B2 * | 3/2012 | Cheng et al. | 370/329 |
| 8,923,878 B2 * | 12/2014 | Morimoto et al. | 455/452.2 |
| 8,989,134 B2 * | 3/2015 | Pison et al. | 370/330 |
| 2009/0180426 A1 | 7/2009 | Sabat et al. | |
| 2010/0098012 A1 | 4/2010 | Bala et al. | |
| 2010/0197263 A1 | 8/2010 | Dwyer et al. | |
| 2012/0005735 A1 | 1/2012 | Prasanna | |
| 2013/0163535 A1 | 6/2013 | Anderson et al. | |

FOREIGN PATENT DOCUMENTS

WO    2010098763 A1    9/2010

OTHER PUBLICATIONS

Corresponding PCT Application No. PCT/US2014/055610—International Search Report with Written Opinion, mailing Date Jan. 28, 2015.

* cited by examiner

*Primary Examiner* — Chandrahas Patel
(74) *Attorney, Agent, or Firm* — Kenneth A. Haas

(57) ABSTRACT

A Long Term Evolution (LTE) Concentrator and Distributor system and method extends geographical coverage while minimizing Evolved Node B (eNB) deployments. The system and method use a distributed array of Wide Band Receiver Transmitter (WBRT) devices (i.e., RF Heads, RFH, including antennas) connected via wide-band links to a central standard LTE eNB through a novel LTE Concentrator-Distributor (LTE-CD) which is an uplink (smart optimal) concentrator and downlink simulcast distributor. The eNB downlink signal (baseband or modulated RF) is distributed in synchronization (simulcast) through the LTE-CD to all WBRTs for downlink simulcast transmission to all UEs in the coverage area. The WBRTs receive uplink signals from user equipment, UE, devices in a coverage area, send the uplink signals (baseband or modulated RF) to the LTE-CD which optimally combines all received signals into one best uplink signal that is sent (in baseband or modulated RF) to the eNB.

18 Claims, 17 Drawing Sheets

LTE CONCENTRATOR AND DISTRIBUTOR SYSTEM AND METHOD FOR COVERAGE EXTENSION

BACKGROUND OF THE INVENTION

The present disclosure relates to wireless networking systems and methods. Long Term Evolution (LTE) is a standard for wireless communication of high-speed data for mobile phones and data terminals developed by the 3$^{rd}$ Generation Partnership Project (3GPP). In standard LTE systems, LTE base stations, called eNodeB, Evolved Universal Terrestrial Radio Access (E-UTRAN) Node B, Evolved Node B, etc., and abbreviated as eNB, must be installed densely enough to ensure coverage of a desired area. In urban areas, the cost of a large number of eNBs needed for such coverage is paid for based on the cellular capacity provided for a large number of users. In future LTE systems designed for Public Safety use (PS-LTE), the number of users (Public Safety users) is relatively much smaller and the cellular capacity associated therewith is also much smaller such that it is not cost effective to maintain a full coverage with a dense PS-LTE eNB network with large excess capacity that comes with it, of which only a small part is used by the Public Safety users. A similar problem can arise in commercial LTE systems covering sparsely populated areas such as in rural areas, international deployments, etc.

Accordingly, there is a need for an LTE Concentrator and Distributor system and method for coverage extension.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
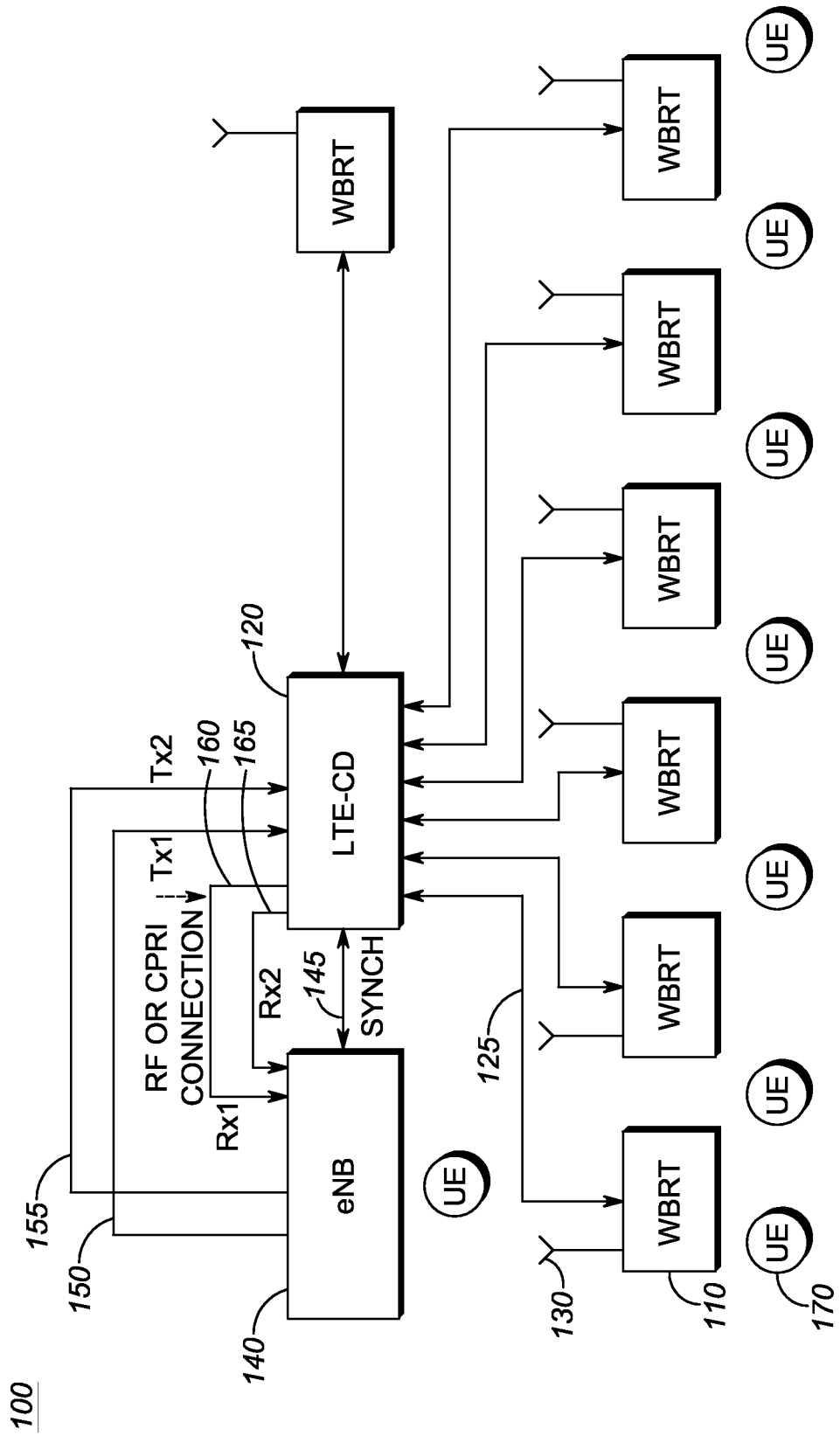
FIG. 1 is a network diagram of an LTE coverage extension system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method to extend radio coverage in a cellular radio telephone Long Term Evolution (LTE) system includes combining all uplink resource block signals received from a plurality of Wide Band Receiver Transmitter (WBRT) devices into a single uplink signal; providing the single uplink signal to an eNodeB (eNB), wherein the plurality of WBRT devices extend coverage of the eNB and each WBRT device is geographically deployed instead of a corresponding eNB; and providing a downlink signal from the eNB in simulcast to each of the plurality of WBRT devices.

In another exemplary embodiment a system to extend coverage in Long Term Evolution (LTE) includes a first LTE concentrator and distributor device configured to communicate to a plurality of Wide Band Receiver Transmitter (WBRT) devices, to other LTE concentrator and distributor devices, and to an eNodeB (eNB); wherein the first concentrator and distributor device is configured to: combine all uplink resource block signals received from the plurality of WBRT devices or the other LTE concentrator and distributor devices into a single uplink signal; provide the single uplink signal to the eNB, wherein the plurality of WBRT devices extend coverage of the eNB and each WBRT device is geographically deployed instead of a corresponding eNB; and provide a downlink signal from the eNB in simulcast to each of the plurality of WBRT devices or the other LTE concentrator and distributor devices.

In yet another exemplary embodiment, a Long Term Evolution (LTE) network includes a Long Term Evolution (LTE) concentrator and distributor device communicatively coupled to an eNodeB (eNB); at least one Wide Band Receiver Transmitter (WBRT) device communicatively coupled to the LTE concentrator and distributor device; another LTE concentrator and distributor device communicatively coupled to the LTE concentrator and distributor device; a low delay communication link between the at least one WBRT device and the LTE concentrator and distributor device; and another low delay communication link between the another LTE concentrator and distributor device and the LTE concentrator and distributor device; wherein the at least one WBRT device is deployed geographical instead of an additional eNB thereby extending geographical coverage of the eNB in a Public Safety LTE deployment or a sparsely populated commercial LTE deployment.

In various exemplary embodiments, systems and methods are disclosed for the extension (enlargement) of the coverage area of an LTE cellular Base Station (eNodeB or eNB), assuming the base station capacity is sufficient for the enlarged coverage area. This includes expanding geographic coverage with a minimal number of eNBs. Each LTE cellular base station (eNodeB, eNB) can have its coverage area extended through a novel LTE Concentrator-Distributor (LTE-CD) device, or a hierarchy of LTE-CD devices, which connect to an array of Wide Band Receiver Transmitter (WBRT) devices spread in a coverage area, covering the uplink and downlink cellular radio communication with LTE User Equipment (UE) devices in the coverage area.

FIG. 1 is a network diagram of an LTE coverage extension system 100 in accordance with some embodiments. FIG. 1 illustrates one sector with a distributed downlink and uplink antenna array for LTE coverage extension. The LTE coverage extension system 100 includes a plurality of WBRTs 110 which are each communicatively coupled to a LTE-CD 120 via a communication link 125, i.e. a wideband link. The communication link 125 can include a microwave link, an optical fiber link, or the like. Each of the WBRTs 110 includes a transmitter/receiver antenna 130, and each of the WBRTs 110 is deployed in a geographic area in lieu of an eNB. Note, the WBRTs 110 can be referred to as Radio Heads (RHs) or the like. The LTE-CD 120 is connected to an eNB 140 via a synchronization link 145, transmitting links (Tx1, Tx2) 150, 155, and receiving links (Rx1, Rx2) 160, 165. The LTE coverage extension system 100 includes UEs 170 which are mobile stations that can be uniformly or non-uniformly distributed throughout the LTE coverage extension system 100. Each UE 170 can be communicatively coupled to one of the WBRTs 110 or the eNB 140.

Each WBRT 110 is configured to communicate with user equipment (UE); provide an uplink signal to the LTE concentrator and distributor device; and provide a downlink signal to the UE. Each LTE concentrator and distributor device is configured to select best uplink resource block signals from the uplink signals received from each of the plurality of WBRT devices; provide the selected best uplink resource block signals to the eNB; and provide the downlink signal from the eNB in simulcast to each of the plurality of WBRT devices.

The WBRTs 110 are auxiliary Remote Radio Frequency (RF) Heads (Downlink Transmitter and Uplink Receiver) spread in a coverage area to ensure the RF coverage of an enlarged area while minimizing eNB requirements. The WBRTs 110 can perform, in the uplink, frequency down conversion (from Radio Frequency, RF, to baseband I, Q components) of the received uplink signal so it can be transferred in baseband I, Q components to the LTE-CD 120, and, in the downlink, frequency up conversion (from baseband I, Q components to RF) of the downlink signal arriving in baseband I, Q components from the LTE-CD 120.

All the WBRT 110 units are connected to the LTE-CD 120 (or hierarchy of LTE-CDs 120) through the communication link 125 which is a high-speed, low-delay communication link (e.g., 1-2 Gb/s) that can use the Common Public Radio Interface (CPRI) standard. The LTE-CD 120 connects to the eNB 140 through open interfaces, e.g., Rx/Tx antenna ports or a CPRI interface. The LTE-CD 120 (or hierarchy of LTE-CDs 120) can include two functions: on the uplink direction, it selects the best uplink LTE Resource Blocks (RBs) from each UE 170 and feeds them to the eNB 140 and, on the downlink direction, it creates a simulcast transmission from the eNB 140 through all WBRTs 110.

In the downlink transmission direction from the eNB 140 to the UE 170, the eNB downlink signal (baseband or modulated RF) is distributed in synchronization (simulcast) from the eNB 140 through the LTE-CD 120 via the communication links 125 to all the WBRTs 110 spread in the coverage area for downlink simulcast transmission to all UEs 170 in the coverage area. In the uplink transmission direction from the UE 170 to the eNB 140, the WBRTs 110 spread in the coverage area receive uplink signals from all UEs 170 in the coverage area, and send the received uplink signals (baseband or modulated RF) to the LTE-CD 120 via the communication links 125. The LTE-CD 120 optimally combines (concentrates) all uplink received signals into one optimal best uplink received signal that is sent (in baseband or modulated RF) to the eNB 140 uplink receive antenna port or the transmit antenna port.

The LTE-CD 120 operation includes optimal concentration (combining) of many LTE uplink signals into one optimal signal for presentation to the eNB 140. The LTE-CD 120 receives, from all the WBRTs 110 (via the communication links 125), their received uplink signals and adjusts their relative delays due to the fixed wide band links. The LTE-CD 120 decomposes all incoming received uplink LTE signals into their constituent Resource Blocks (RB) in the frequency domain. This can be done by a Digital Fourier Transform (DFT) algorithm or any other decomposition method in the frequency domain. Next, the LTE-CD 120 performs a selection or combining of RBs.

For the LTE Physical Uplink Shared Channel (PUSCH), the LTE-CD 120 can select, for each RB, the best received copy among all the WBRTs' received signals, based on received RB power or RB signal-to-noise Ratio (SNR) or any other metric of received signal quality, or combining several good RBs after adjusting their relative delays. For the Physical Uplink Shared Channel (PUCCH) and Physical Random Access Channel (PRACH), the LTE-CD 120 can sum all received RBs or select the best grouped PUCCH RBs and PRACH RBs. Subsequently, the LTE-CD 120 can perform an output uplink signal reconstruction where the LTE-CD 120 optimally combines all selected or summed RBs of all uplink received signals into one best uplink received signal that is sent (in baseband or modulated RF) to the eNB 140 uplink receive antenna port. This can be done by an Inverse Digital Fourier Transform (IDFT) algorithm or any other inverse decomposition method in the frequency domain.

The LTE-CDs 120 can also be cascaded in an LTE-CD hierarchy with the outputs of several first level LTE-CDs 120 and outputs of additional WBRTs 110 being fed to a second level LTE-CD 120 and then recursively to a third level LTE- CD 120 and so forth—in a hierarchical way. The optimal uplink signal from the last single LTE-CD 120 is sent (in baseband or modulated RF) to the eNB uplink receive antenna port.

The system function has been validated in simulations showing an increase of the uplink coverage area by a factor of 5.76 for a throughput rate of 240 kbit/sec. In an exemplary embodiment, the systems and methods can provide an LTE coverage solution for public safety users or for consumer users where user density is expected to be sparse thereby providing ubiquitous LTE coverage without having to deploy sparsely used and costly eNBs. Other applications are also contemplated. Additionally, the systems and methods seek to provide a solution that works within the LTE standards and is compatible with commercial off-the-shelf (COTS) eNBs and user equipment (UEs).

Figure 2:
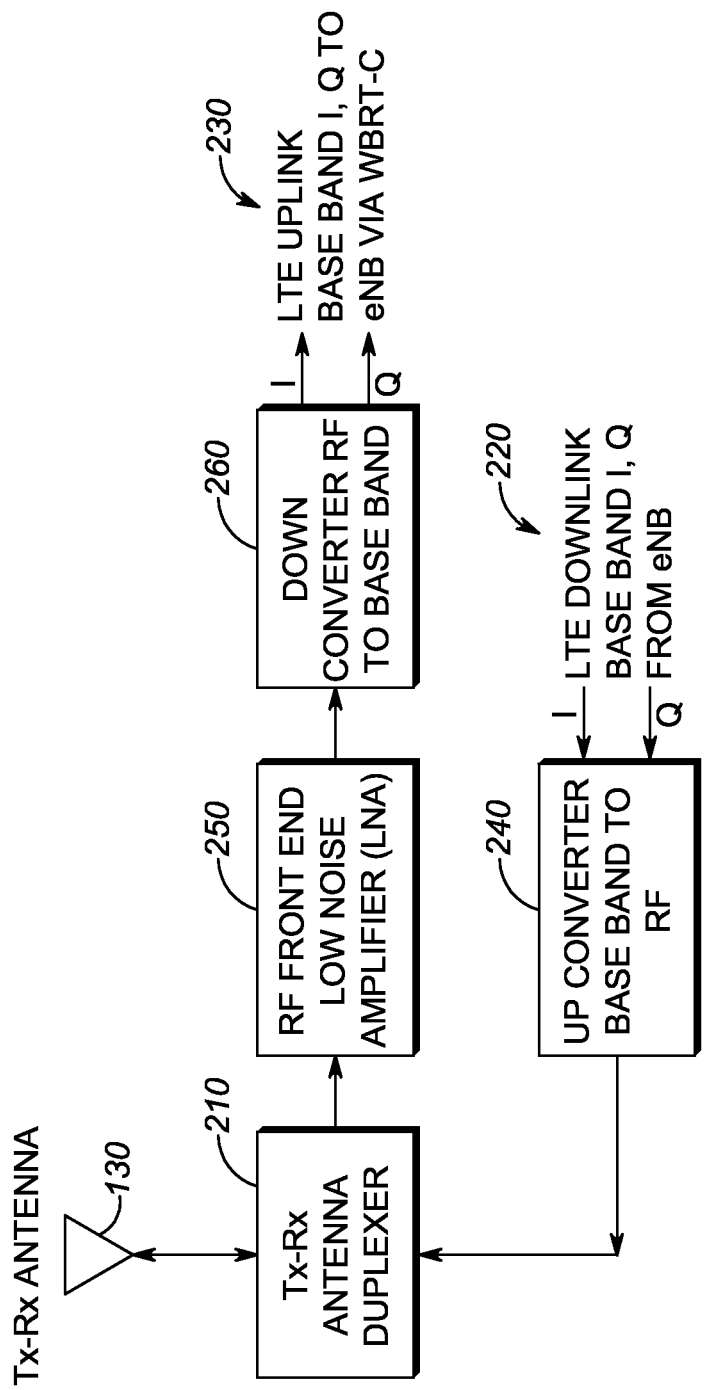
FIG. 2 is a block diagram of exemplary functionality of a WBRT in the LTE coverage extension system of FIG. 1 in accordance with some embodiments.

FIG. 2 is a block diagram of exemplary functionality of the WBRT 110 in the LTE coverage extension system 100 in accordance with some embodiments. Conceptually, the WBRTs 110 can be viewed as eNB repeaters which provide eNB coverage without the full complement of eNB equipment. The WBRT 110 includes the transmitter/receiver antenna 130 which is communicatively coupled to a transmitter/receiver duplexer 210. The transmitter/receiver duplexer 210 allows bidirectional communication by the transmitter/receiver antenna 130 between a downlink direction 220 and an uplink direction 230. In the downlink direction 220, the WBRT 110 receives an LTE downlink baseband signal (in-phase (I) and quadrature (Q)) from the eNB 140 through the LTE-CD 120, and an up converter 240 receives the baseband signal and converts it to RF for transmission by the transmitter/receiver antenna 130 through the transmitter/receiver duplexer 210. The WBRT 110 works in the downlink direction 220 to transmit, in simulcast, an eNB downlink signal which is received through the LTE-CD 120 and via the communication link 125 which is an appropriate low delay communication link (e.g., a microwave wireless link or an optical fiber link).

In the uplink direction 230, the transmitter/receiver antenna 130 receives an uplink signal that is provided to an RF front end low noise amplifier (LNA) 250 by the transmitter/receiver duplexer 210. The RF front end LNA 250 provides a filtered uplink signal to a down converter 260 which converts the filtered uplink signal from RF to baseband. The WBRT 110 works in the uplink direction 230 to receive the total uplink signal present at their site and transfer it to the LTE-CD 120 via the communication link 125. In an exemplary embodiment, the WBRT 110 uses the same communication link 125 in both directions 220, 230, i.e., downlink and uplink.

Figure 3:
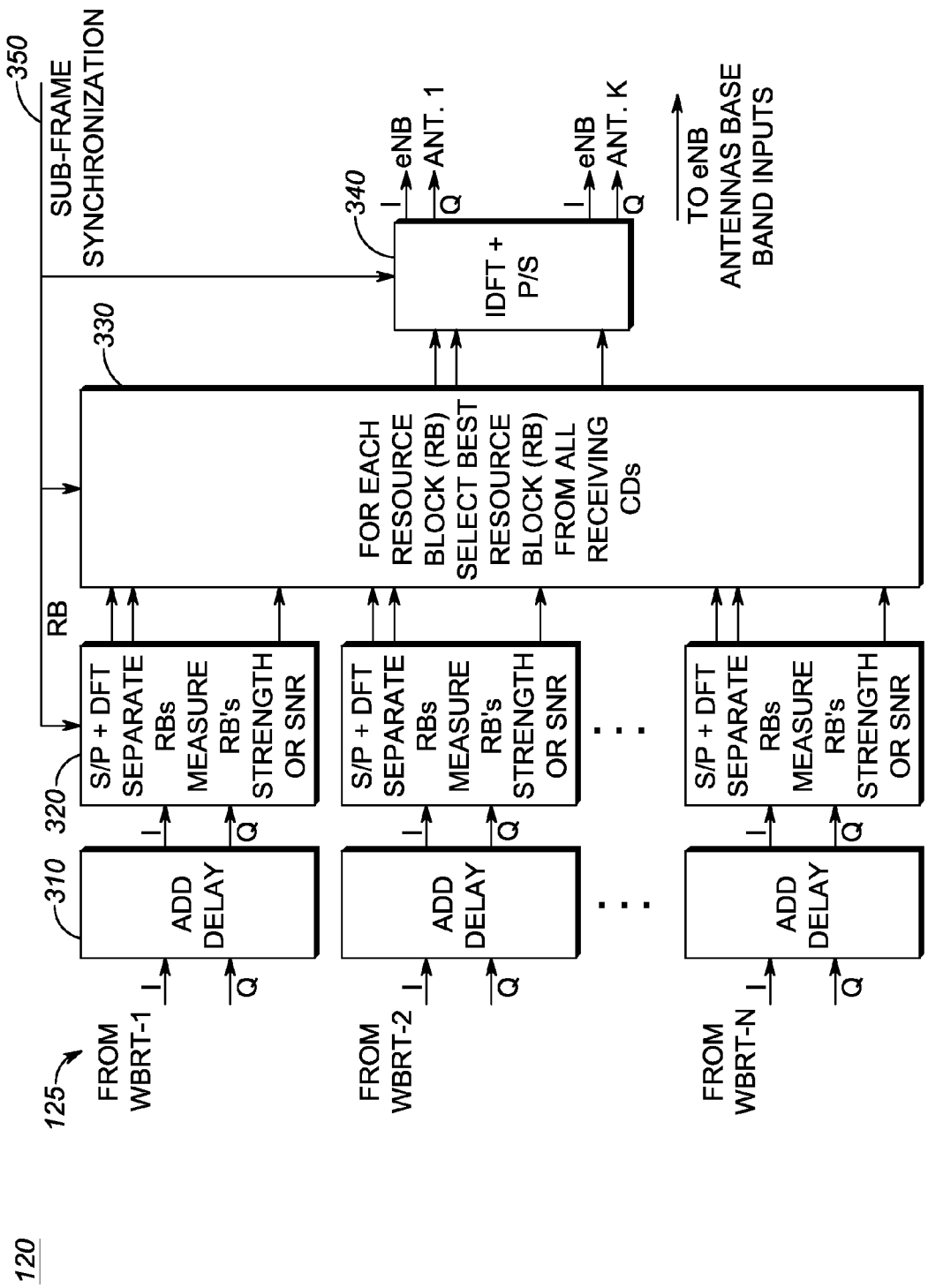
FIG. 3 is a block diagram of exemplary functionality of the new invented LTE Concentrator-Distributor (LTE-CD) in the LTE coverage extension system of FIG. 1 in accordance with some embodiments.

FIG. 3 is a block diagram of exemplary functionality of the LTE-CD 120 in the LTE coverage extension system 100 in accordance with some embodiments. The LTE-CD 120 is communicatively coupled to a plurality of the WBRTs 110 each via the communications link 125 and to the eNB 140. The LTE-CD 120 selects the best uplink signal among all the WBRTs 110 for uplink reception to the eNB 140 and in the downlink direction transmits a downlink signal from the eNB 140 in Simulcast through all the WBRTs 110, thus, giving a larger uplink and downlink RF coverage area to the eNB 140. FIG. 3 illustrates the functionality of the LTE-CD 120 from an uplink direction. The functionality of the LTE-CD 120 in the downlink direction (not shown) includes simulcasting the downlink signal from the eNB 140 to all of the WBRTs 110.

In the uplink direction, the LTE-CD 120 includes uplink signals from each of the WBRTs 110 (e.g., I and Q) which are processed through a corresponding delay block 310. The delay blocks 310 add a delay to the signal received from a corresponding WBRT to better synchronize the voting/selection and/or combining of RBs performed by a common processing block 330. Next, each of the uplink signals from each of the WBRTs 110 are processed by a processing block 320. The processing block 320 performs a serial to parallel (S/P) conversion and discrete Fourier Transform (DFT) to separate resource blocks (RBs) and to measure strength and/or signal-to-noise ratio (SNR) of each of the RBs. Outputs of each of the processing blocks 320 are provided to the common processing block 330. The common processing block 330 performs a voting or selection function on all of the RBs received from each of the WBRTs 110 and, for each RB, the common processing block 330 selects a best RB from all receiving WBRTs. The common processing block 330 provides an output to a processing block 340 that performs an inverse DFT and parallel to serial (P/S) conversion before providing a signal to the eNB 140, i.e., as baseband inputs into antennas on the eNB 140. The processing blocks 320, 330, 340 all receive sub-frame synchronization 350 by a Common Public Radio Interface (CPRI) from the eNB 140. A Random Access Channel (RACH) time/frequency is found by configuration or by monitoring the downlink System Information Block (SIB).

The LTE-CD 120 can be viewed as an LTE Comparator (Voter) that performs, in the uplink reception direction, a decomposition of the received uplink LTE signal from each WBRT 110 into the different Resource Blocks (RB) and then a smart selection of the Resource Blocks of the different uplink channels: PUSCH, PUCCH and PRACH. The PRACH and PUCCH RBs (whose location can be derived from monitoring the eNB downlink System Information Block, SIB, broadcast) are summed up without selection and sent to the eNB 140 for detection. This increases the background noise but detection is still very good due to the high SNR after correlation of the Zadoff-Chu sequences.

The PRACH timing is determined by the eNB 140, such as according to the strongest PRACH correlation peak. The PUSCH RB signals undergo a smart selection algorithm over all received Up-Link (UL) Resource Blocks (RB) signals arriving from the different remote WBRT 110 units, deciding which RB goes to which of the multiple eNB receive antenna feeds. The selection could be based on signal strength or best Signal-to-Noise-and-Interference Ratio, SNIR, measured on the first symbol in the RB. Changes in the selection of the WBRT 110 for a particular RB occur on different UL RBs (Uplink Resource Blocks); the LTE-CD smart selection algorithm could avoid unnecessary changes in selection that could cause degradation in throughput due to phase and time delay discontinuities.

The LTE-CD 120 is much less complex and less costly than a full LTE receiver, i.e., acting just as a "smart LTE comparator" that feeds the best RBs to the multiple eNB uplink receive antenna feeds. For example, a sampling rate of a 10 MHz LTE baseband signal I, Q components is about 2×15.36 MHz=30.72 MHz; 10 bits/sample, would require a bidirectional communication rate of 307.2 Mbit/sec (2×155 Mbit/sec. i.e. an OC-3 or STM-1 microwave link), 16 bits/sample, would require a bidirectional communication rate of 491.52 Mbit/sec, etc. The maximum end-to-end delay is assumed to be less than 667 μsec (the eNB 140 can support Uplink Timing Advance of 100 km distance). Advantageously, this is achievable in an exemplary realization of the LTE coverage extension system 100.

The appropriate LTE Circular Prefix (CP) format for the LTE coverage extension system 100 system is the longest CP format that allows more eNB receiver tolerance to delays introduced in the system 100 by the communication links 125 between the WBRTs 110 and LTE-CD 120 and the LTE-CD Comparator processing. The uplink power control could be set to a low initial value due to the UE TX power due to the proximity of the WBRTs 110 to the UEs 170. Neighbor cell UE interference is expected to be statistically small since the number of UEs 170 is small and they are spread over a large area as expected in a public safety LTE system or a rural LTE commercial system. In the case of a Public safety emergency event in a cell of a particular WBRT 110, there will be more calls and more UEs 170 in that WBRT 110 cell and that WBRT 110 would be selected by the LTE-CD 120.

Figure 4:
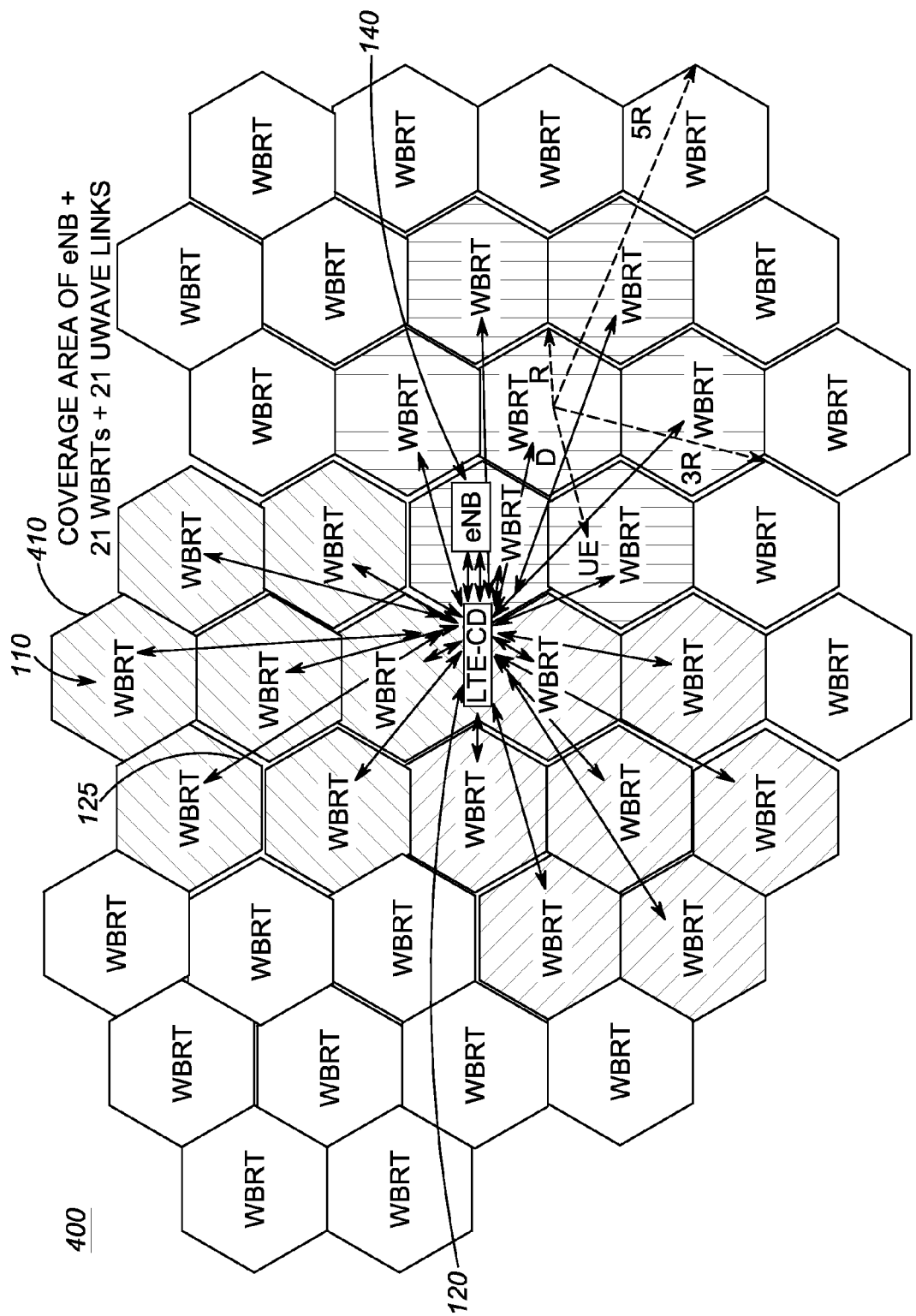
FIG. 4 is an LTE coverage extension system with a geographical layout with one-level voting in accordance with some embodiments.
Figure 5:
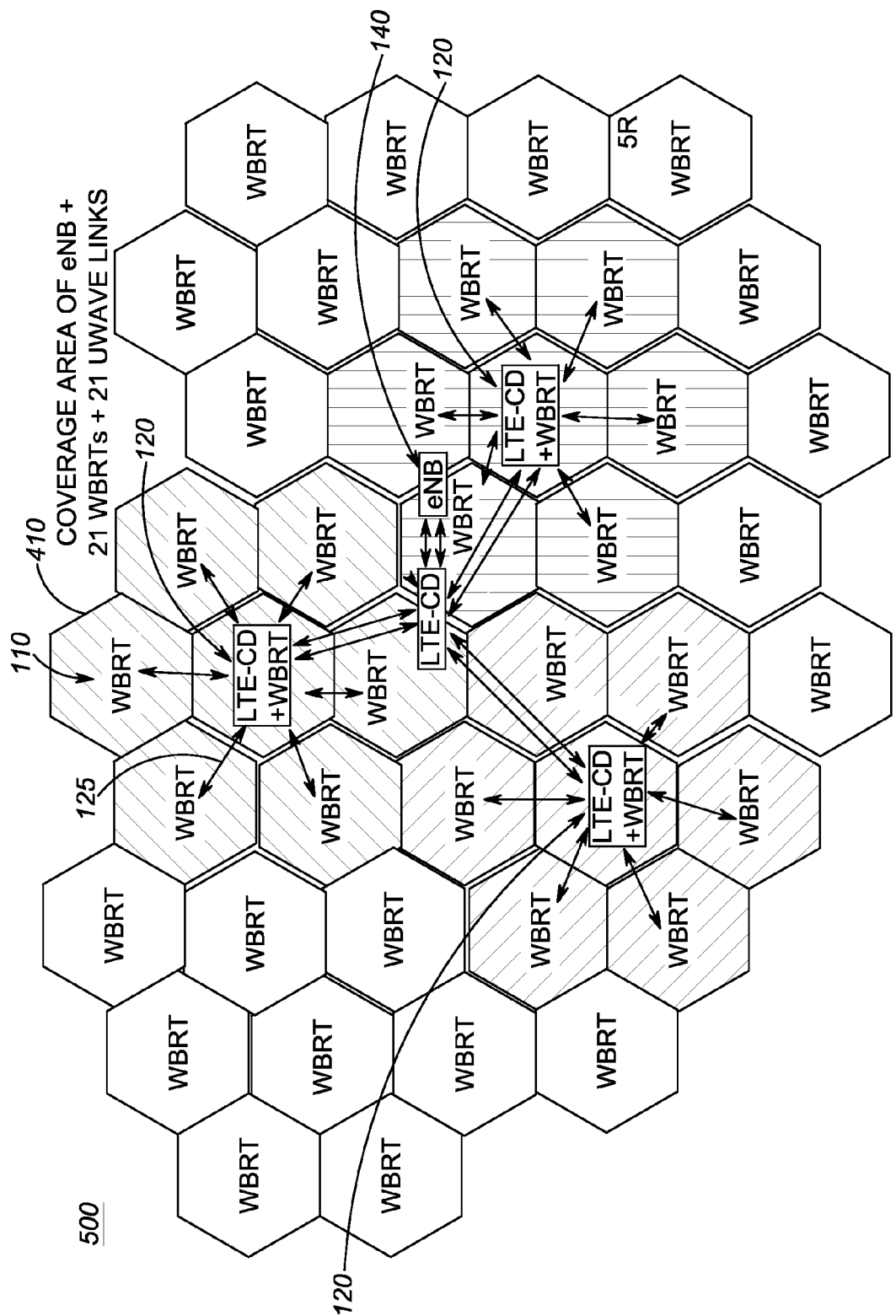
FIG. 5 is an LTE coverage extension system with a geographical layout with hierarchical voting in accordance with some embodiments.
Figure 6:
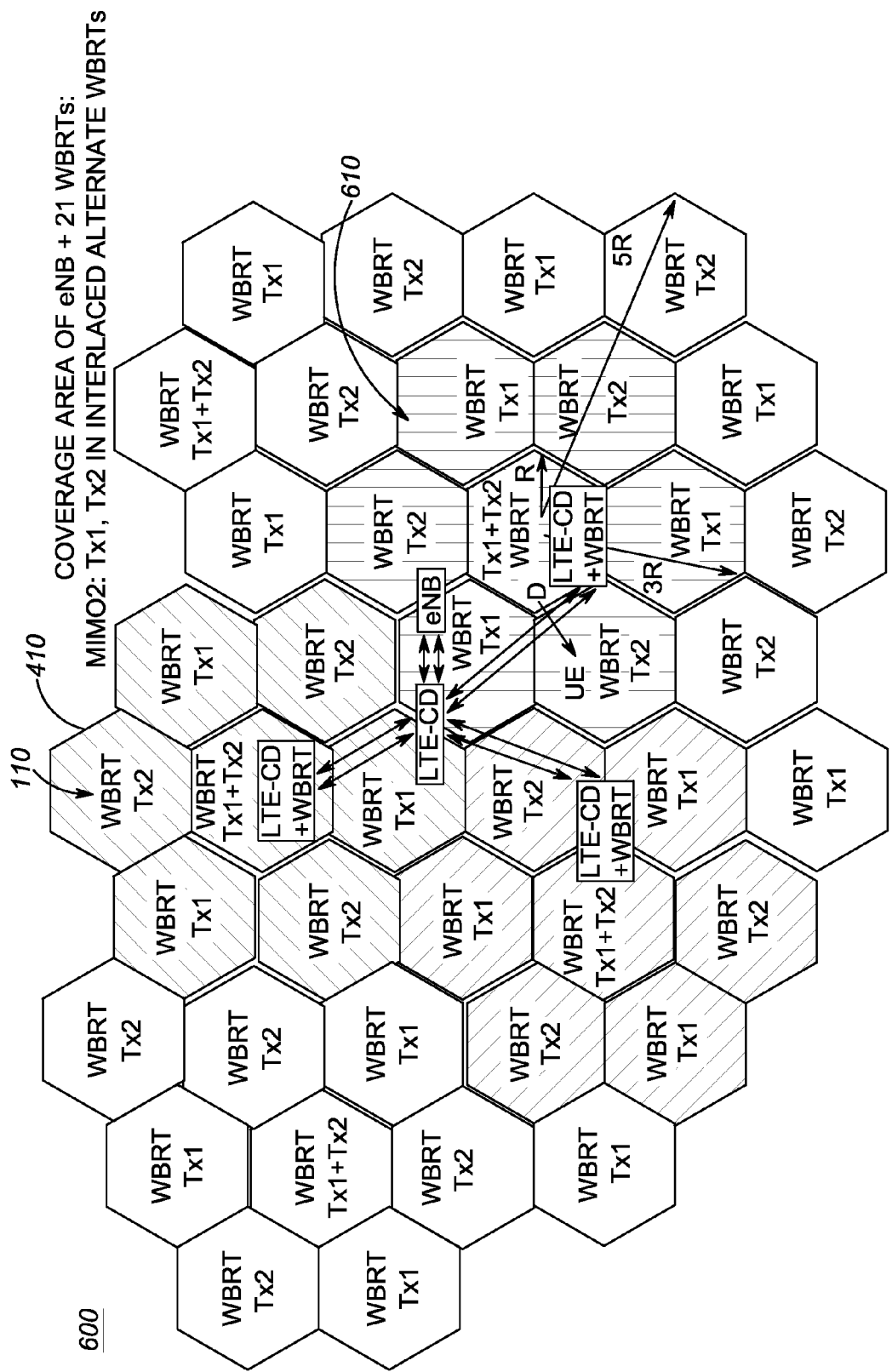
FIG. 6 is an LTE coverage extension system with a geographical layout with various MIMO-capable WBRTs in accordance with some embodiments.

FIGS. 4-6 are network diagrams showing geographical relationships of the various components in the LTE coverage extension system 100 in accordance with some embodiments. FIG. 4 is an LTE coverage extension system 400 with a geographical layout with one-level voting. The LTE coverage extension system 400 includes a plurality of cells 410, specifically 21 of the cells 410 include a WBRT 110. FIGS. 4-6, for illustration purposes, focus on the downlink portion of the LTE coverage extension system 400, thus the WBRTs 110 are illustrated as WBRs in FIGS. 4-6. In an exemplary embodiment, a cell radius of the cells 410 may be slightly larger than a cell radius of a cell with the eNB 140, for example a ratio of about 1/1.23 between the cell radiuses. In FIG. 4, the eNB 140 is centrally located with a single LTE-CD 120 connected thereto and with each of the WBRTs 110 connected to the LTE-CD 120 via the communication link 125 (which can be, e.g., a microwave link).

FIG. 5 is an LTE coverage extension system 500 with a geographical layout with hierarchical voting. Specifically, the LTE coverage extension system 500 has a similar geographical layout as the LTE coverage extension system 400, namely a plurality of cells 410 (e.g., 21) with each cell 410 including a WBRT 110. The LTE coverage extension system 500 includes four LTE-CD 120 in a hierarchical fashion. That is, there are three $1^{st}$ level LTE-CDs 120 distributed, one for each of seven cells 410, which communicate to seven WBRTs 110 via the communication links 125, and a central $2^{nd}$ level LTE-CD 120 located with the eNB 140 which communicates to each of the three distributed LTE-CDs 120 such as via one of the communication links 125. In this exemplary embodiment, the three distributed LTE-CDs 120 perform a first level of voting, and the central LTE-CD 120 performs a second level of voting. The hierarchical local voting scheme has a lower maximum length and lower average length of the needed communication links 125, thus increasing the links 125 reliability and reducing their cost.

FIG. 6 is an LTE coverage extension system 600 with a geographical layout with various Multiple-Input/Multiple-Output (MIMO)-capable WBRTs 110. Specifically, FIG. 6 does not illustrate LTE-CD 120 placement, and the LTE coverage extension system 600 can operate with the LTE-CDs 120 in a similar fashion as the LTE coverage extension systems 400, 500. In the LTE coverage extension system 600, the WBRTs 110 can include MIMO2 antennas, e.g. Tx1, Tx2, and Tx1+Tx2. The LTE coverage extension system 600 includes an interlaced deployment for the WBRTs 110 with different MIMO2 antennas. For example, in a group 610 of seven cells 410, a center cell 410 can include an MIMO2 antenna of Tx1+Tx2 and surrounding cells 410 can alternate between MIMO2 antennas of Tx1 and Tx2.

Figure 7:
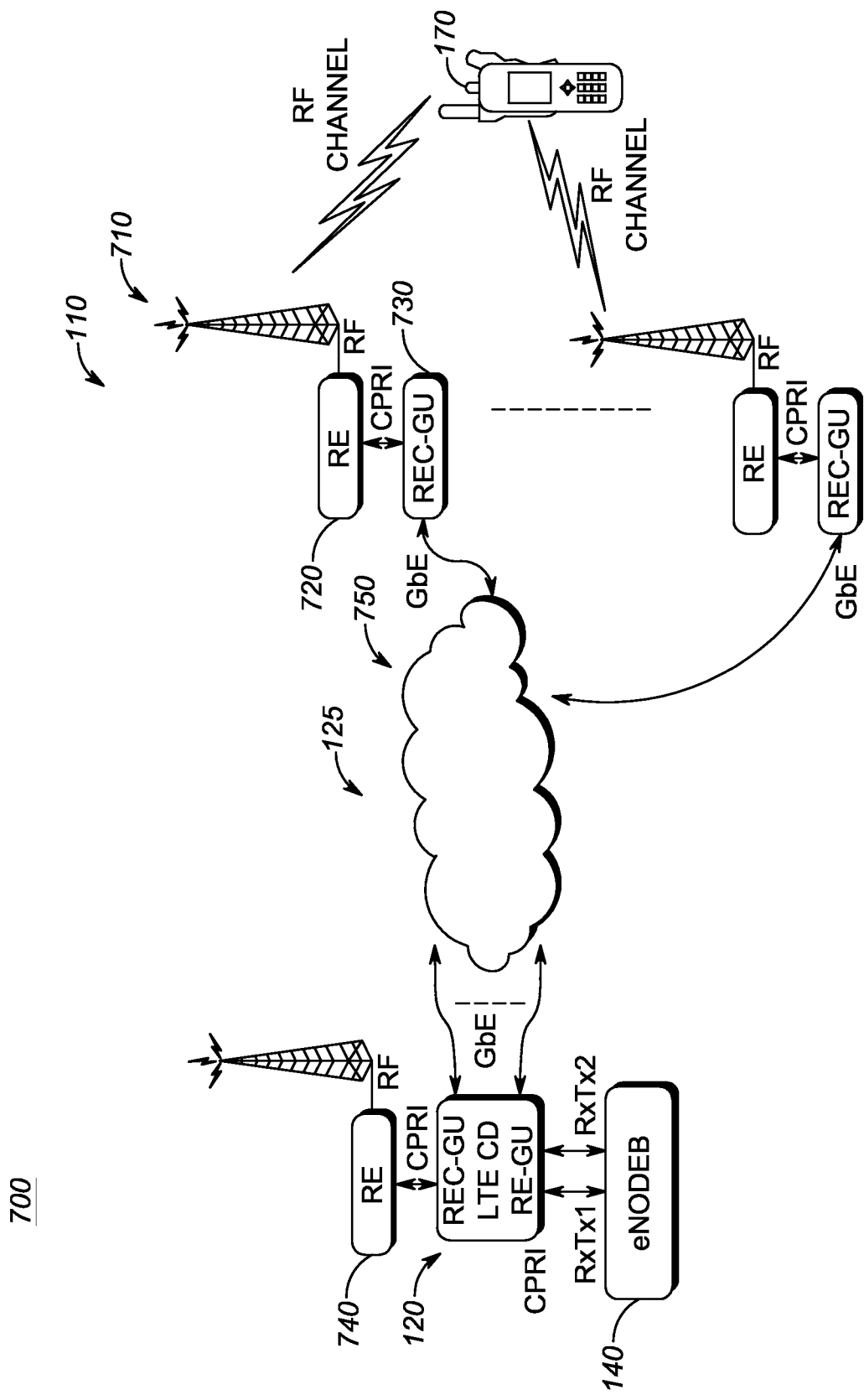
FIG. 7 is a network diagram of a backhaul system with each WBRT connected to the LTE-CD directly in accordance with some embodiments.
Figure 8:
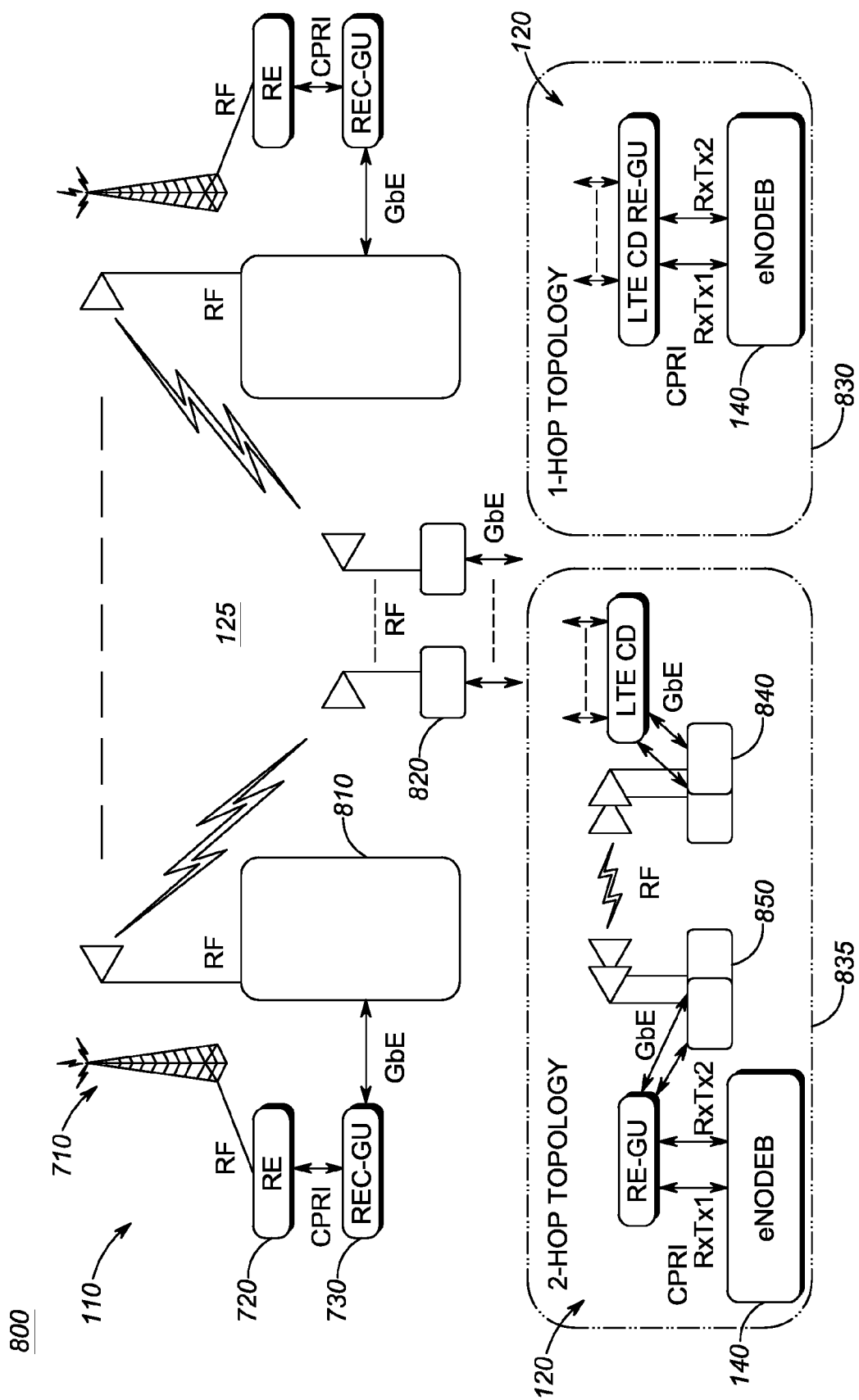
FIG. 8 is a network diagram of a backhaul system with each WBRT utilizing point-to-point connections over a microwave link network with one or more hops (LTE-CD hierarchical levels) in accordance with some embodiments.

FIGS. 7 and 8 are exemplary practical implementation network diagrams of the system and communication backhaul in the LTE coverage extension system in accordance with some embodiments. FIG. 7 is an implementation network diagram of a LTE coverage extension and backhaul system 700 in an exemplary embodiment with each WBRT 110 connected to the LTE-CD 120 directly. The backhaul system 700 is a baseband backhaul system and can include a plurality of WBRTs 110 which include RF equipment 710 providing connectivity to the UEs 170. The WBRT 110 can include or be connected to radio equipment (RE) 720 which connects to the RF equipment 710 and acts as a CPRI slave to a radio equipment control (REC) gateway unit (GU) 730. The REC-GU 730 acts as a CPRI master, and the RE 720 and/or the REC-GU 730 can be commercial-off-the-shelf (COTS) products. The REC-GU 730 can form the communication link 125 with the LTE-CD 120. In this exemplary embodiment, the communication link 125 includes a point-to-point (P2P) gigabit Ethernet (GbE) link over a backhaul network 750 although other implementations are also contemplated. Each of the WBRTs 110 can include similar equipment to form their corresponding communication link 125.

The communication links 125 connect the WBRTs 110 to the LTE-CD 120. The LTE-CD 120 can also be connected to RE 740 associated with the eNB 140 with a CPRI link therebetween. The LTE-CD 120 can include the REC-GU 730, a RE-GU, and a voting-simulcast GU (LTE-CD) each of which connects to the various communication links 125 from the connected WBRTs 110. The three components, the REC-GU 730, the RE-GU, and the voting-simulcast GU (LTE-CD) can be implemented together in a same platform on the same hardware with software configured thereon to perform associated functions. As described herein, the voting-simulcast GU can perform the voting functionality in the uplink direction between the LTE-CD 120 and the WBRTs 110 and the simulcast functionality in the downlink direction. The three components, the REC-GU 730, the RE-GU, and the voting-simulcast GU, connect to the eNB 140 including a CPRI link therebetween.

FIG. 8 is a network diagram of a backhaul system 800 in an exemplary embodiment with each WBRT 110 utilizing P2P GbE over a microwave link network with one or more hops. Similar to the backhaul system 700, the backhaul system 800 includes one or more WBRTs 110 and the RF equipment 710, the RE 720, and the REC-GU 730. In the backhaul system 800, the REC-GU connects to a microwave link device 810, e.g. via a GbE link or the like. The microwave link device 810 connects to a corresponding microwave link device 820 at the LTE-CD 120 location. The backhaul system 800 is illustrated in a one-hop variation 830 and a two-hop (2-level LTE-CD) variation 835. In the one-hop (1-level LTE-CD) variation 830, there is a single hop between the microwave link devices 810, 820, and the microwave link device 820 connects to the three components, the REC-GU 730, the RE-GU, and the voting-simulcast GU (LTE-CD) such as via a GbE or the like. The three components, the REC-GU 730, the RE-GU, and the voting-simulcast GU, connect to the eNB 140 including a CPRI link therebetween.

In the two-hop (2-level LTE-CD) variation, there are two hops with additional microwave link devices 840, 850 included. Here, the components, the voting-simulcast GU and the RE-GU, are split. For example, the two hops include a first hop between the microwave link devices 810, 820 and a second hop between the microwave link devices 840, 850. The microwave link device 820 connects to the voting-simulcast GU which in turn connects to the microwave link device 840, e.g. via a GbE or the like. The microwave link device 850 connects to the RE-GU which connects to the eNB 140 including a CPRI link therebetween.

Figure 9:
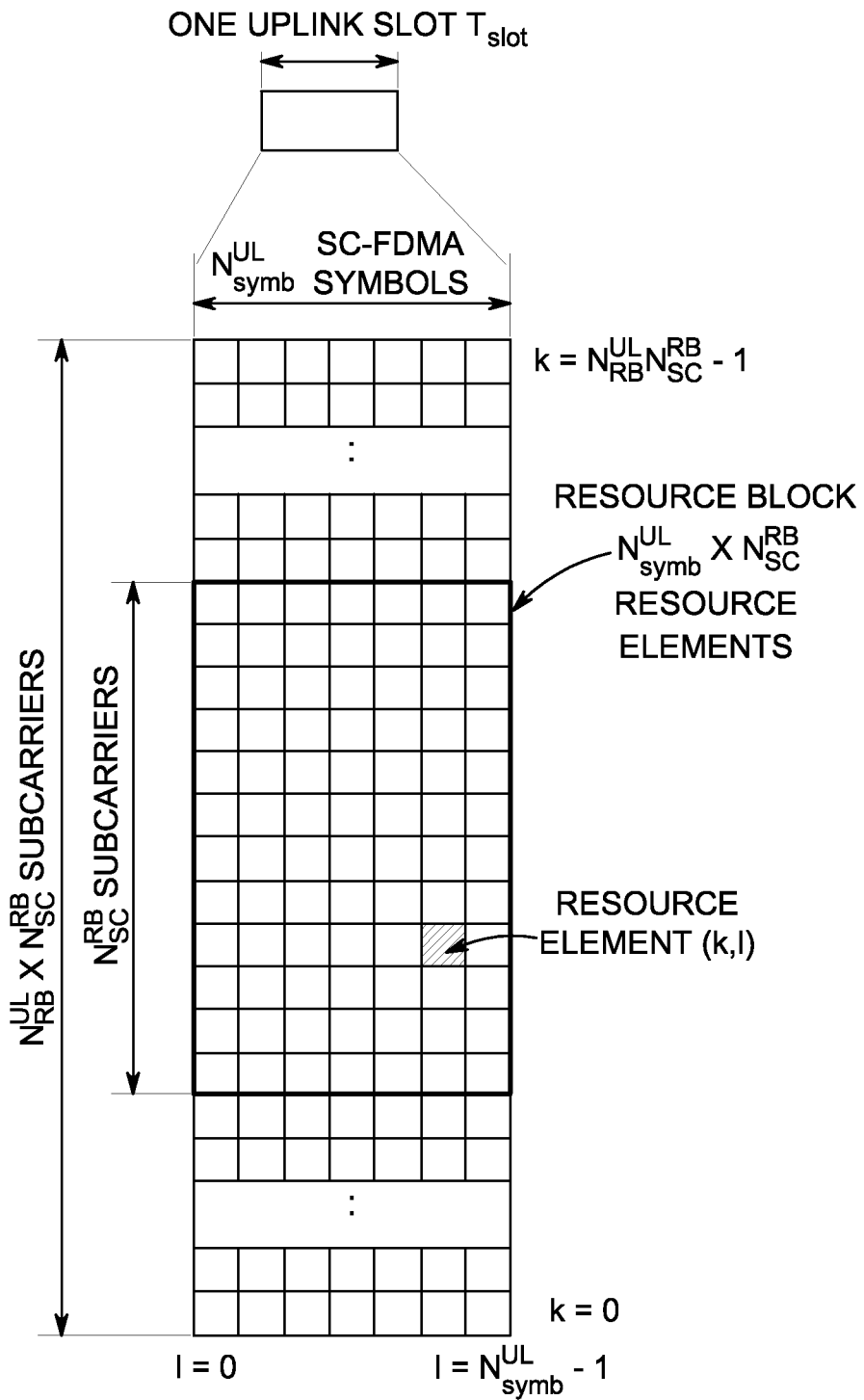
FIG. 9 is a block diagram of LTE uplink time slots and Resource Blocks in accordance with some embodiments

FIG. 9 is a block diagram of LTE uplink time slots and Resource Blocks in accordance with some embodiments. The smallest resource unit in the time domain is an SC-FDMA symbol in the uplink, and the number of symbols in a time slot depends on a length of the cyclic prefix being used as a guard period between the symbols. The smallest dimensional unit for assigning resources in the frequency domain is a Resource Block with a bandwidth of 180 kHz, which corresponds to $N_{SC}=12$ subcarriers each at 15 kHz offset from carrier. The uplink include three physical channels—PUCCH, PUSCH, and PRACH. The PUCCH carries uplink control information and is never transmitted simultaneously with PUSCH data. PUCCH conveys control information including channel quality indication (CQI), ACK/NACK responses of the UE to the HARQ mechanism, and uplink scheduling requests.

Resources for the PUSCH are allocated on a sub-frame basis by a UL scheduler. Subcarriers are allocated in multiples of 12 because, as stated earlier, a Resource Block has 12 subcarriers. In turn, a Resource Block comprises multiple Resource Elements (REs), wherein each RE is a subcarrier over a time slot. Subcarriers may be hopped from sub-frame to sub-frame. The PUSCH may employ QPSK, 16-QAM, or 64-QAM modulation. The PRACH carries the random access preamble and coordinates and transports random requests for service from mobile devices. The PRACH channel transmits access requests (bursts) when a mobile device desires to access the mobile system (call origination or paging response).

Again, the LTE-CD 120 performs in the uplink reception direction a decomposition of the received uplink LTE signal from each WBRT 110 unit into the different Resource Blocks (RB) and then a smart selection of the Resource Blocks of the different uplink channels: PUSCH, PUCCH and PRACH. The PRACH and PUCCH RBs (whose location can be derived from monitoring the eNB downlink System Information Block, SIB, broadcast) are summed up without selection and sent to the eNB for detection. This increases the background noise but detection is still very good thanks to the high SNR after correlation of the Zadoff-Chu sequences. The PRACH timing is determined by the eNB, probably according to the strongest PRACH correlation peak. The PUSCH RB signals undergo a smart selection algorithm over all received Up-Link (UL) Resource Blocks (RB) signals arriving from the different remote WBRT 110 units, deciding which RB goes to which of the multiple eNB receive antenna feeds. The selection would be based on signal strength or best Signal-to-Noise-and-Interference Ratio, SNIR, measured on the first symbol in the RB. Changes in the selection of a WBRT 110 for a particular RB occur on different UL RBs (Uplink Resource Blocks); the LTE-CD smart selection algorithm would avoid unnecessary changes in selection that could cause degradation in throughput due to phase and delay discontinuities.

Figure 10:
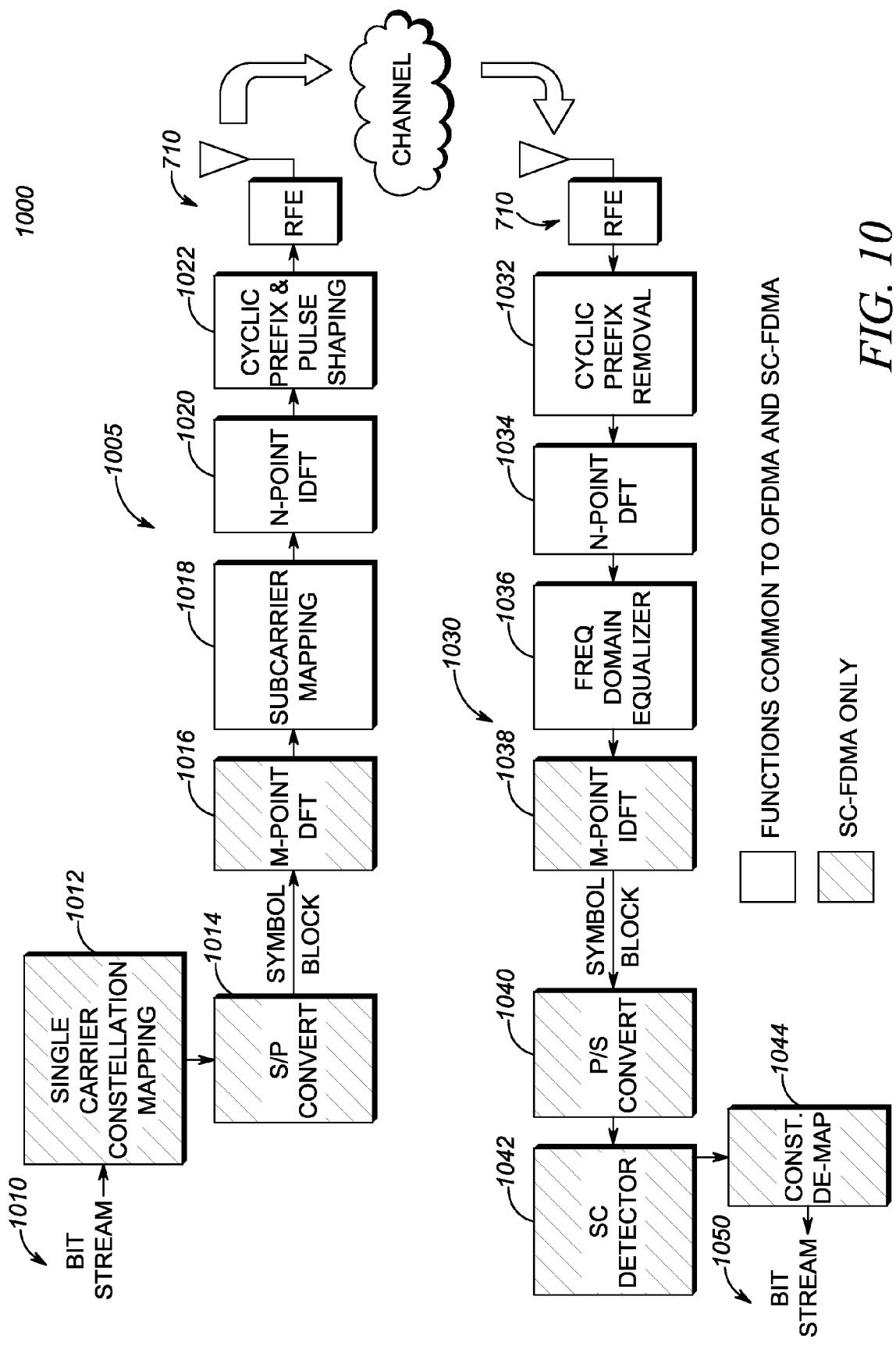
FIG. 10 is a diagram describing LTE UL SC-FDMA modulation/de-modulation in accordance with some embodiments.

FIG. 10 is diagram describing LTE UL SC-FDMA modulation/de-modulation 1000 in accordance with some embodiments. The modulation/de-modulation 1000 explains the feasibility of LTE uplink reception even in the presence of phase and time jumps due to changing the selection of a WBRT 110 receiver by the LTE-CD 120 by the operation of the Frequency Domain Equalizer in the LTE receiver. A modulation portion 1005 includes a received bit stream 1010, a single carrier constellation mapper 1012 that maps the bit stream to points in a constellation to produce a symbol stream, a serial to parallel (S/P) converter 1014 that converts the symbol stream to M parallel streams of symbols, and an M-point Discrete Fourier Transformer (DFT) 1016 and subcarrier mapping function 1018 that assign the symbols from the S/P converter 1014 to M orthogonal frequency domain subcarriers. The modulation portion 1005 further includes an N-point inverse DFT 1020 that transforms each symbol of the M multiple parallel symbols, which symbol is assigned to a frequency domain subcarrier, to a time domain signal, that is, that modulates the symbols with one of N time domain subcarriers, thereby producing N parallel modulated orthogonal time domain subcarriers and that converts the time domain subcarriers from a parallel form to a serial form to produce an output signal, and a cyclic prefix adder and pulse shaper 1022 that appends a cyclic prefix to, and pulse shapes, the output signal for transmission over a channel via the RF equipment 710.

A de-modulation portion 1030 includes the RF equipment 710 that receives the data from the channel, a cyclic prefix remover 1032 that removes the cyclic prefix that had been appended to the signal, an N-point DFT 1034 that converts the prefix-less signal from a serial to a parallel form, outputting N parallel modulated subcarriers and converts the N parallel modulated subcarriers from a time domain to N frequency domain subcarriers, a frequency domain equalizer 1036, and an M-point inverse DFT 1038 that transforms the N multiple parallel frequency domain subcarriers to M parallel time domain subcarriers, wherein each subcarrier of the M parallel subcarriers is modulated by a corresponding symbol. The de-modulation portion 1030 further includes a parallel to serial converter 1040 that converts the M parallel time domain subcarriers from a parallel form to a serial form, a subcarrier detector 1042 that demodulates the symbols, and a constellation de-mapper 1044 that maps each symbol to a corresponding point in the constellation used by single carrier constellation mapper 1012, thereby recovering the bits corresponding to that point, providing an output bit stream 1050. The eNB 140 performs channel equalization prior to the M-point IDFT 1038, and the channel equalization is based on Reference Symbols on a per-RB basis (in the RB the reference symbols are staggered in time/frequency with 4 symbols/6 sub carriers spacing). Accordingly, the eNB 140 is capable of overcoming possible phase and delay "jumps" that will be encountered by the LTE-CD 120.

The longest CP format can be used to ensure maximum tolerance to delays introduced by the communication links 125 and the LTE-CD 120 processing. The uplink power control could set a low value to the UE 170 transmit power due to the proximity of the WBRT 110 to the UE 170. Neighbor cell UE interference is expected to be statistically small since the number of UEs 170 is small and they are spread on a large area based on the expected use cases of the LTE coverage extension systems. In the case of a Public safety emergency event in a cell of a particular WBRT 110, there will be more calls and more UEs 170 in that WBRT 110 cell and that WBRT 110 would be selected by the LTE-CD 120.

Figure 11:
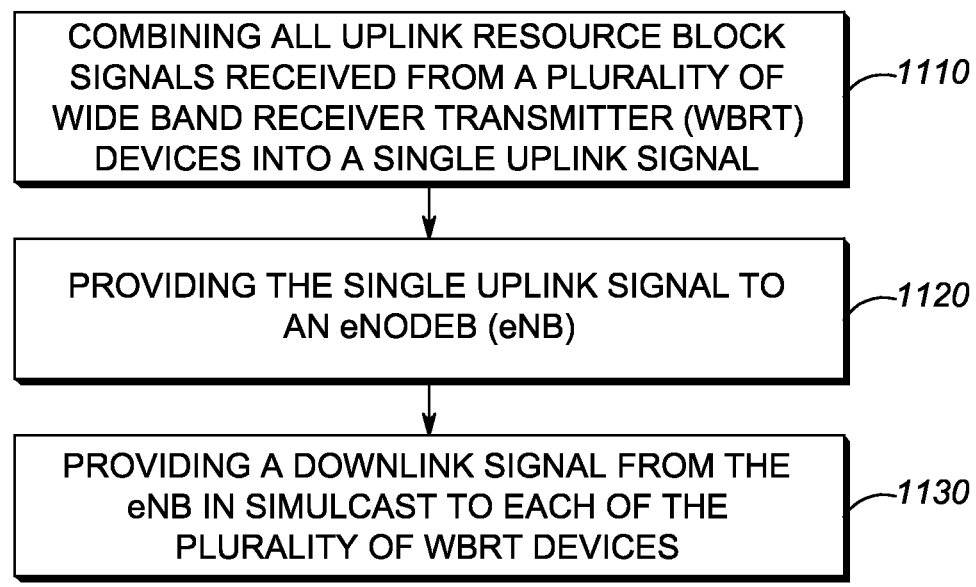
FIG. 11 is a flowchart of a method to extend coverage in Long Term Evolution (LTE) in accordance with some embodiments.

FIG. 11 is a flowchart of a method 1100 to extend coverage in a Long Term Evolution (LTE) network in accordance with some embodiments. The method 1100 contemplates operation in the various systems described herein, namely a new system for LTE uplink and downlink coverage extension, using an array of WBRT units connected to an LTE eNB through a new innovative LTE LTE-CD. The method 1100 is performed by the LTE LTE-CD 120 in the various systems described herein. The method 1100 includes combining, by the LTE-CD, all uplink resource block signals received from a plurality of Wide Band Receiver Transmitter (WBRT) devices into a single uplink signal (step 1110). Here, the method 1100 uses the LTE-CD 120 to combine or concentrate uplink resource blocks from multiple WBRTs so that they can be presented to the eNB 140 as a single uplink signal. That is, the WBRTs 110 do not perform LTE processing on the uplink, but rather act as coverage extenders for the eNB 140.

The method 1100 includes providing, by the LTE-CD, the single uplink signal to an eNodeB (eNB) (step 1120). Again, the WBRTs 110 are coverage extenders and the eNB 140 performs all of the LTE-related processing. Using the techniques described herein, the WBRTs 110 communicate via LTE standard compliant techniques such that the WBRTs are transparent to the eNB 140. The plurality of WBRT devices extend coverage of the eNB and each WBRT device is geographically deployed instead of a corresponding eNB. That is, the method 1100 enables several times more coverage area with the eNB without having to deploy additional costly eNBs. The method 1100 further includes providing, by the LTE-CD, a downlink signal from the eNB in simulcast to each of the plurality of WBRT devices (step 1130). Here, each WBRT receives a same downlink signal for broadcast in its geographical area as if the eNB 140 was physically present therein.

The method can further include receiving, by the LTE-CD, the uplink resource block signals in baseband from each of the plurality of WBRT devices via a low delay communication link; and transmitting, by the LTE-CD, the downlink signal in simulcast and in baseband to each of the plurality of WBRT devices via the low delay communication link. For example, the low delay communication link can include a microwave wireless link or an optical fiber link. The method 1100 can include utilizing a long Circular Prefix (CP) to accommodate delay introduced by the low delay communication link to maintain LTE compliance.

The combining in step 1110 can include decomposing uplink resource block signals from each of the plurality of WBRT devices and performing a selection algorithm over all decomposed uplink resource block signals from all of the plurality of WBRT devices. The method 1100 can further include performing the selection algorithm including selecting the best uplink resource blocks based on any of signal strength or Signal-to-Noise-and-Interference Ratio measured on a first symbol in an associated resource block. The combining in step 1110 can further include summing Physical Random Access Channel (PRACH) and Physical Uplink Shared Channel (PUCCH) resource blocks from each of the plurality of WBRT devices without selection. The method 1100 can also include monitoring, by the LTE-CD, the downlink signal from the eNB to determine locations of the PRACH and PUCCH resource blocks.

The combining in step 1110 can further include selecting, for each Physical Uplink Shared Channel (PUSCH) resource block, a best received copy of a resource block among all copies of the resource block received from the WBRTs based on resource block power or signal-to-noise ratio. The method 1100 can further include performing the combining in a hierarchical fashion prior to performing the providing the single uplink signal to the eNB. Additionally, the method 1100 can further include communicating, by the LTE-CD, with the eNB via Long Term Evolution (LTE) compliant mechanisms, thereby allowing the eNB to be a commercial off-the-shelf (COTS) system, wherein the LTE compliant mechanisms comprise one of receiver/transmitter antenna ports or a Common Public Radio Interface (CPRI).

In other embodiments, the method 1100 can also be implemented in a wireless system including a first LTE concentrator and distributor device configured to communicate to a plurality of Wide Band Receiver Transmitter (WBRT) devices, to other LTE concentrator and distributor devices, and to an eNodeB (eNB) as well as in an LTE network.

The systems and methods described herein offer a cost-effective solution for providing large LTE coverage with a small number of users (larger area with low capacity—relatively few users) at a lower costs (significantly lower equipment and operating costs). It is expected that the LTE coverage extension system can be utilized in Public Safety LTE deployments, rural LTE deployments, international LTE deployments, etc. It is expected that the WBRT 110 and the LTE-CD 120 will cost less than half the costs of a standard LTE eNB equipment. Advantageously, the WBRT 110 and the LTE-CD 120 fit into the existing LTE standards without requiring modification and can operate with commercial-off-the-shelf LTE equipment such as the eNBs 140, etc. Thus, the LTE coverage extension system is compatible with any LTE eNB vendor and any LTE User Equipment (UE) with no standard changes. The proposed system interfaces with the LTE eNB 140 through the open interface of the eNB 140, i.e., the Rx antennas feeds or the CPRI interface.

In testing of the LTE coverage extension system, a significant enlargement efficiency of the uplink reception area (×5.8 for 7 WBRTs) was determined for the Uplink Shared Channel PUSCH using the invented system, for a throughput rate greater than 240 kbit/sec (half the area would support even higher rates of 500-600 kbit/sec). This showed good area enlargement efficiency since 7 Omni WBRTs 110 cover almost the same area as 6 Omni eNBs 140. This coverage area enables 8 UEs sending 240 kbit/sec each all the time. The LTE coverage extension systems 400, 500, 600, using three sectors can cover an area greater by a factor of 3×5.8=17.3 (vs. Omni antenna eNB area), or ×17.3/1.49=11.6 vs. a three sector eNB area.

Simulation results also show that the Uplink Control Channel PUCCH performs well (>99% ACK detect rate) with the system in the enlarged area of the PUSCH. It is assumed that the Uplink Random Access Channel PRACH would also perform well since it has a very high Signal to Noise Ratio (SNR) after correlation. For detecting the PRACH, one would monitor the System Information Block (SIB) in the eNB downlink broadcast transmission to find the location (RBs) of the PRACH and, in reception, the LTE-CD 120 would sum up all the PRACH RB signals received from all WBRTs 110 and feed them to the eNB 140 for detecting the PRACH. The summation would increase the background noise, but the SNR after correlation with the ZC sequences would be high enough for the detection of timing.

Thus, the LTE coverage extension system for a seven node WBRT 110 system, as compared to an Omni antenna eNB, provides uplink rates greater than 240 kb/sec in the coverage area. For PUSCH, the LTE coverage extension system extends Omni eNB uplink coverage radius at rates greater than 240 kb/sec, from 10 km by 1 Omni antenna eNB to 24 km by seven Omni WBRTs 110. A three sector eNB has a coverage area greater by ×1.48 but can support three such enlarged areas with the WBRTs giving a coverage area gain over a factor greater than 11 times relative to the area of a three sector eNB. For PUCCH, a 99% ACK detect rate, per standard compliant requirements, is achieved for 24 km radius 7 Omni WBRT 110 system. With respect to PRACH, it is assumed that its location can be found by decoding the eNB System Information Block (SIB) downlink broadcast messages and knowing the PRACH location and summing all WBRTs' PRACH signals, no problems are expected with PRACH detection, (high SNR after correlation). PRACH with the long sequence format adds delay robustness and even more robustness to the direct sum detection.

For Down-Link PDSCH, an eNB QPSK 4Tx Omni antenna has about a 20 km radius at 240 kbit/sec (24.4 km for 3 sector antenna), and the LTE coverage extension system enables a 24 km radius seven Omni WBRT uplink only system (×5.76 area vs. Omni eNB). An eNB 64QAM 1Tx Omni antenna has about a 10 km radius at 600 kb/sec (12.2 km for 3 sector antenna), and the LTE coverage extension system enables ×2.1 coverage area for a seven WBR system.

Figure 12:
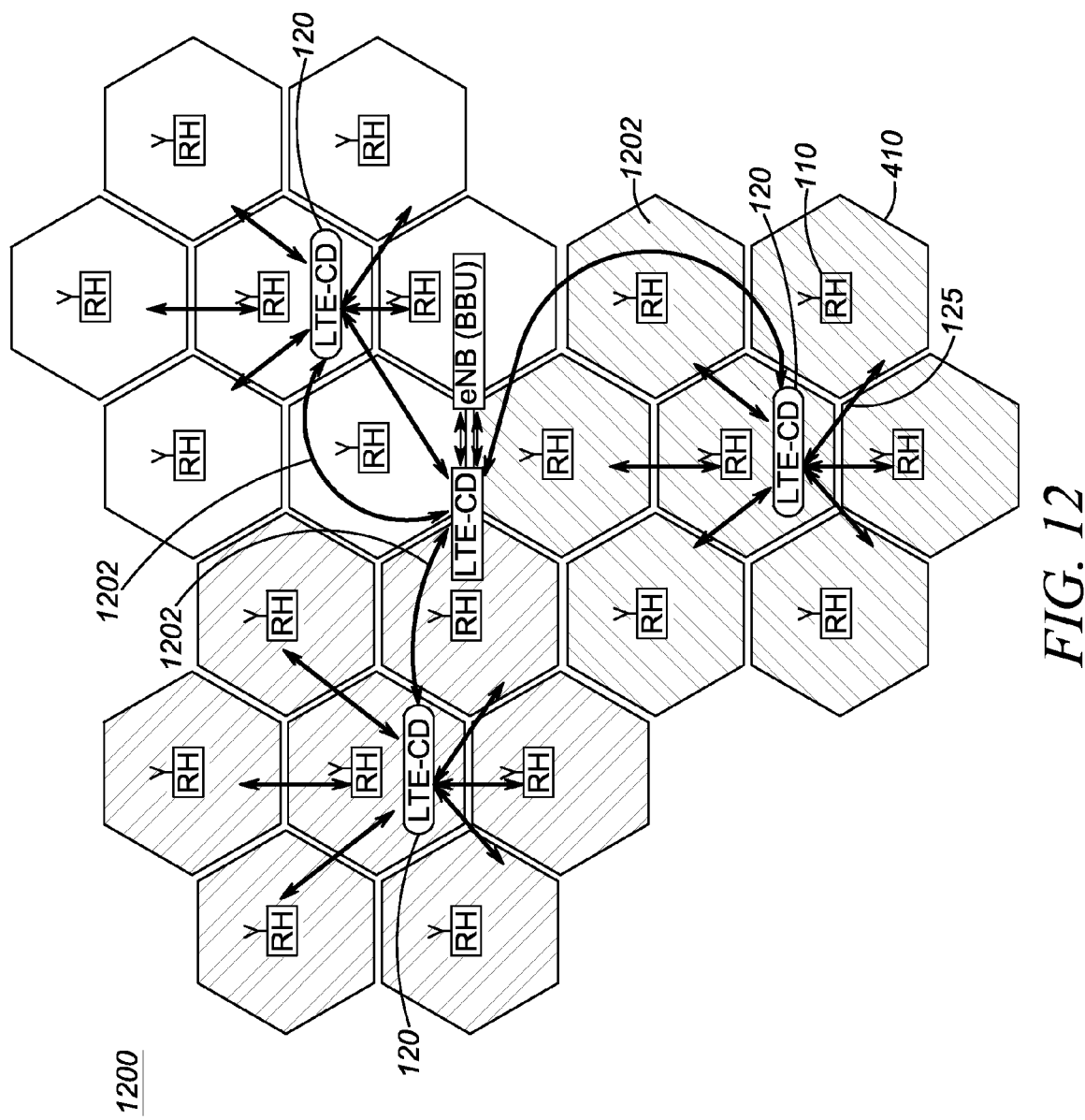
FIG. 12 is a network diagram of an exemplary LTE coverage extension system for coverage extension a three-sector eNB, using a one level LTE-CD hierarchy in accordance with some embodiments.

FIGS. 12-16 are network diagrams of various exemplary wireless LTE architectural structures that use multiple LTE-CDs (possibly in hierarchy) to extend eNB coverage, enhance eNB performance and reduce cost and complexity of LTE coverage such as for a sparsely populated cellular coverage area. FIG. 12 is a network diagram of an exemplary LTE coverage extension system 1200 for coverage extension in accordance with some embodiments. The LTE coverage extension system 1200 includes an eNB communicatively coupled to three LTE-CDs 120 via high-speed communication links 1202 (e.g., 2 Gb/s). Each LTE-CD 120 services a seven cell 410 area with a WBRT 110 contained in each of the cells 410 (i.e., the WBRT 110 is labeled RH). The WBRTs 110 are connected to the LTE-CD 120 via the communication link 125 (e.g., 1 Gb/s).

Figure 13:
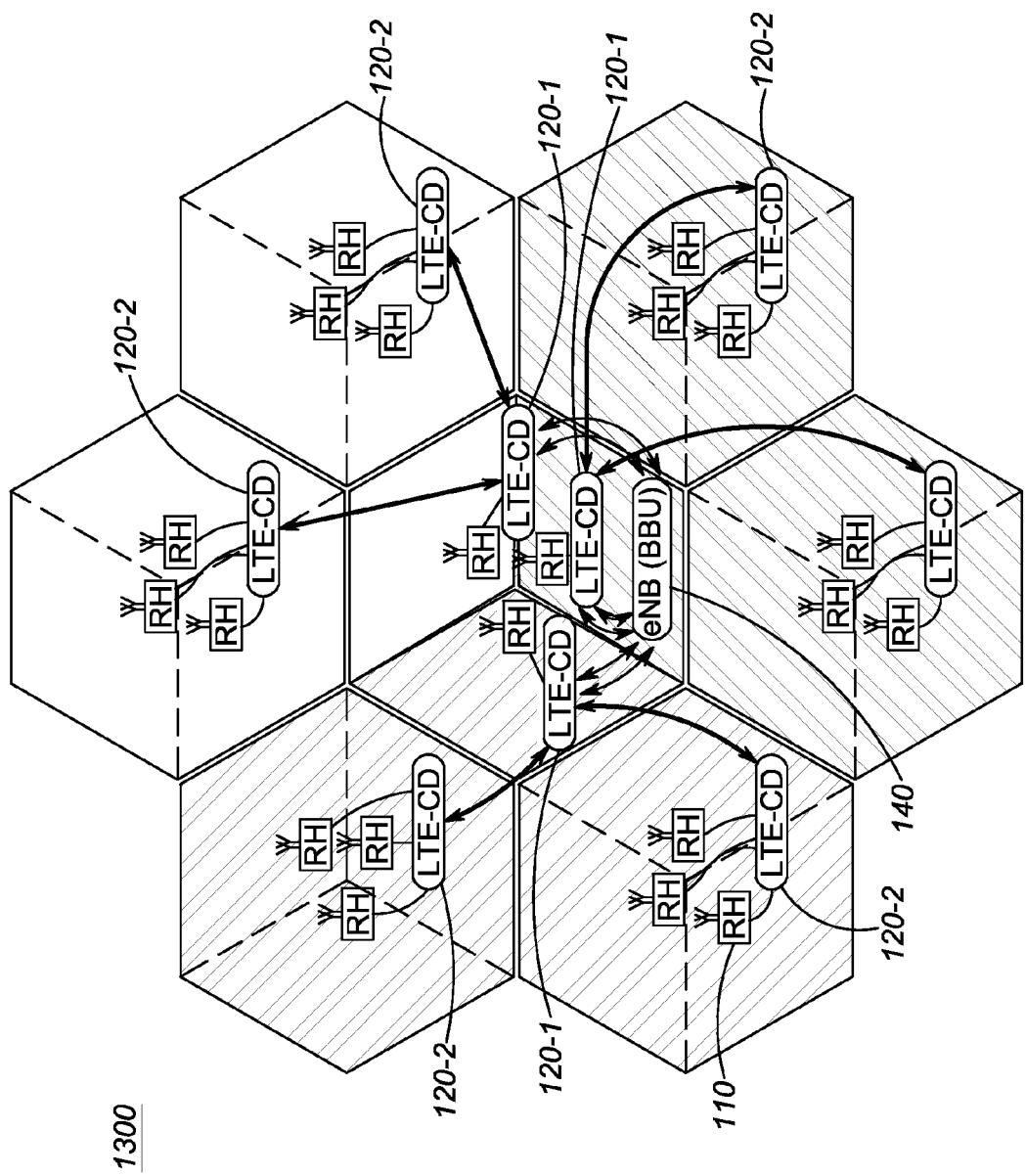
FIG. 13 is a network diagram of an exemplary LTE coverage extension system a three-sector eNB, using a two-level LTE-CD hierarchy in accordance with some embodiments.

FIG. 13 is a network diagram of an exemplary LTE coverage extension system 1300 using a two-level hierarchy in accordance with some embodiments. The LTE coverage extension system 1300 includes an eNB 140 communicatively coupled to a first tier of LTE-CDs 120-1 which are communicatively coupled to a second tier of LTE-CDs 120-2. The second tier of LTE-CDs 120-2 are communicatively coupled to various WBRTs 110 (i.e., the WBRT 110 is labeled RH). The second tier of LTE-CDs 120-2, in the exemplary LTE coverage extension system 1300, combine three local sector broadband signal pairs into one sector broadband signal pair. The first tier of LTE-CDs 120-1 combine one local sector broadband (BB) signal pair and two remote second tier LTE-CD 120-1 output BB signal pairs. Accordingly, 2.33 cells become a sector from the perspective of the eNB 140 in the LTE coverage extension system 1300.

The LTE-CD 120 can concentrate (combine) the uplink received signals from several (e.g., typically 3-6) co-located sector antennas (i.e., the WBRTs 110) to one optimal uplink signal that can be sent (via wideband links) to the eNB 140 directly or through multiple level LTE-CDs for further concentration with other LTE-CD outputs or LTE WBRT outputs. Thus one eNB 140 plus one or multiple level LTE-CDs 120 can replace several 3-Sector eNBs in covering the same coverage area. In sparsely populated areas, for example, three to six sectors can be concentrated by a LTE-C D and fed to a low cost low capacity one-sector micro-eNB to replace the expensive excessively high capacity eNB.

Figure 14:
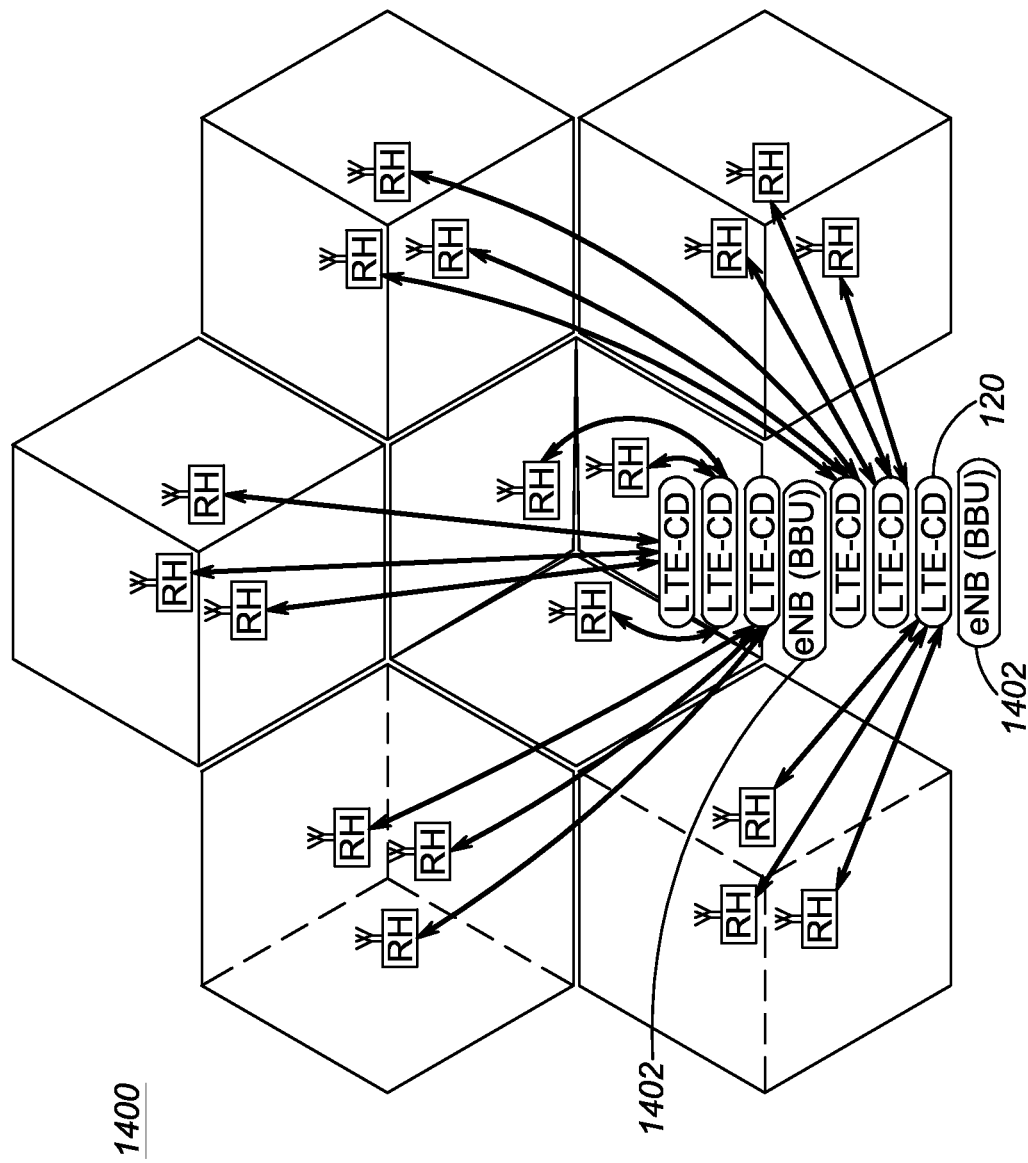
FIG. 14 is a network diagram of an exemplary eNB hotel arrangement using the LTE-CDs in accordance with some embodiments.

FIG. 14 is a network diagram of an exemplary eNB hotel arrangement 1400 using the LTE-CDs 120 in accordance with some embodiments. The eNB hotel arrangement 1400 is also referred to as a cloud Radio Access Network (RAN) with multiple three sector eNBs 1402 in one location. Here, several eNB sectors (e.g. typically 3-6) can be concentrated into one eNB sector utilizing the LTE-CDs 120, thus reducing the number of three sector eNBs 1402 in the eNB-Hotel needed for full coverage. In the exemplary eNB hotel arrangement 1400, the LTE-CDs 120 provide a 3:1 reduction in the eNBs 1402.

Figure 15:
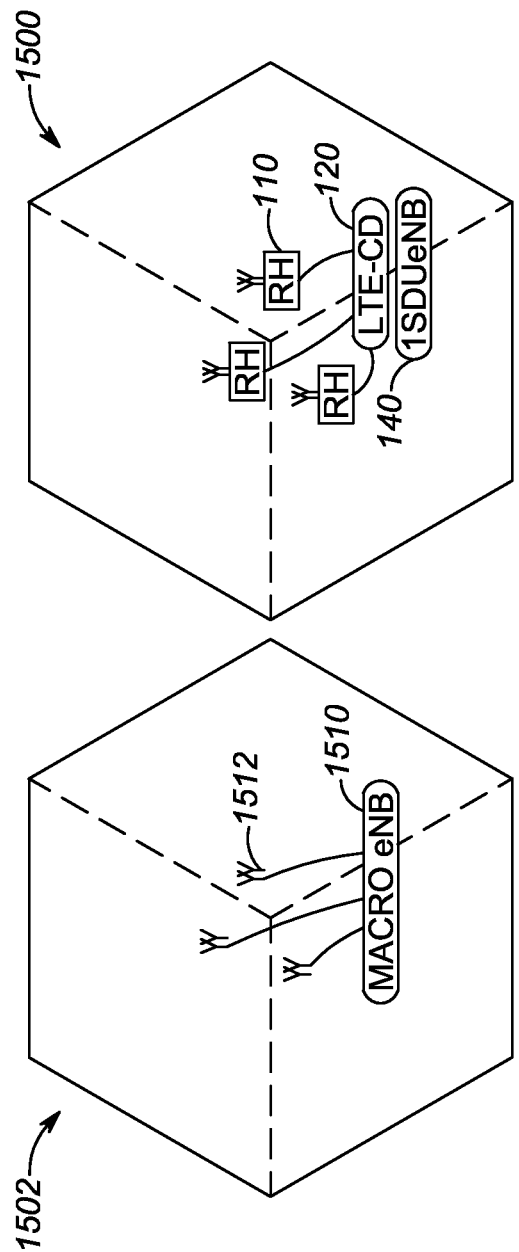
FIG. 15 is a network diagram of a network using a microcell digital unit (baseband), the LTE-CD and the WBRTs to form a three sector macro cell in accordance with some embodiments.
Figure 16:
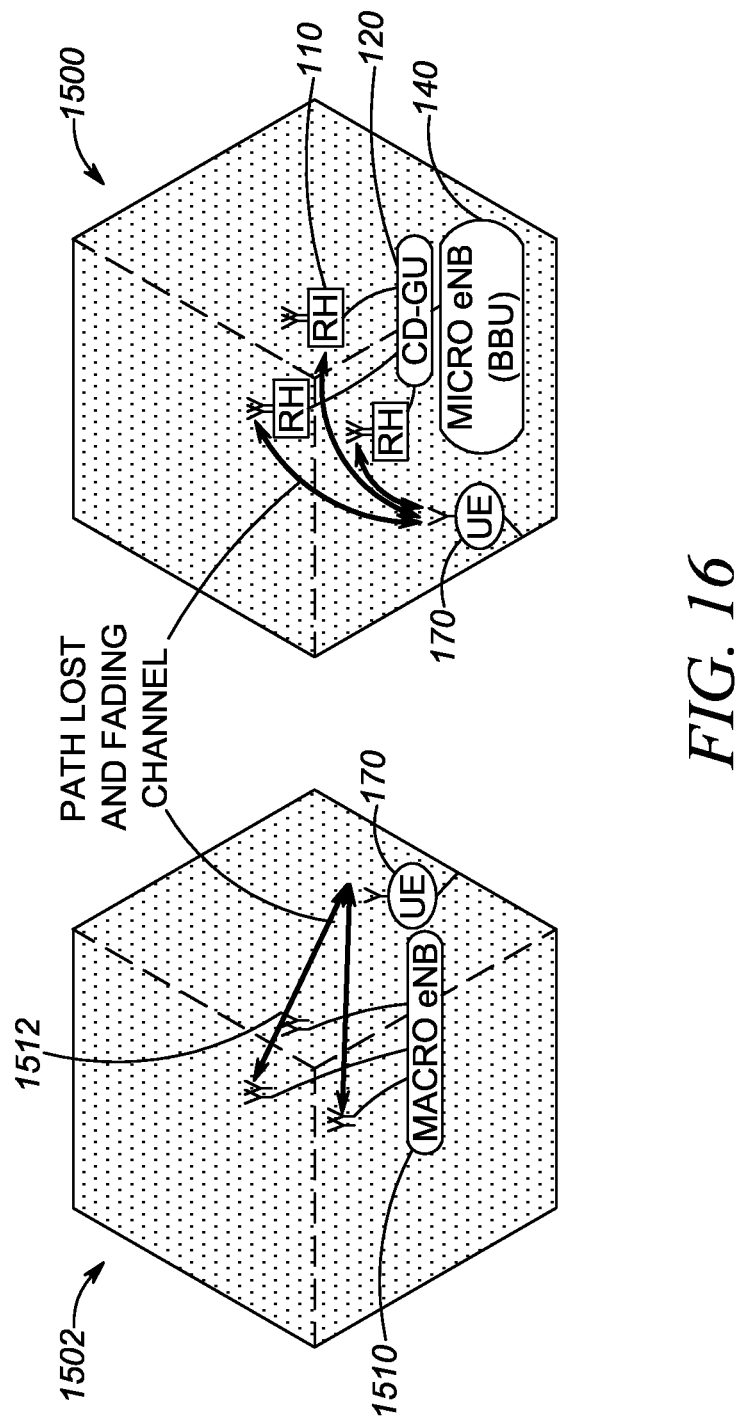
FIG. 16 is a network diagram of the network of FIG. 15 for purposes of simulating the LTE-CD performance in accordance with some embodiments.

FIG. 15 is a network diagram of a network 1500 using the LTE-CD 120 and the WBRTs 110 to form a three sector macro cell in accordance with some embodiments. First, a network 1502 illustrates a macro eNB 1510 connected to three sector antennas 1512. In the network 1500, the LTE-CD 120 and the WBRTs 110 can provide similar coverage as the network 1502 with a one sector eNB 140 (or micro eNB). FIG. 16 is a network diagram of the network 1500 for purposes of simulating the LTE-CD performance in accordance with some embodiments. Simulations were performed using various UE 170 locations in the network 1500, 1502 to compare normal eNB/UE operation versus eNB with LTE-CD 120 operation including measuring Throughput, ACK detect Rate etc. at each UE location. Further, a Hata-Okumura Path Loss model (Rural) with Log-Normal Margin (9 dB for 95% reliability) was performed along with Fading Channel (ETU70). Based on the foregoing the LTE-CD 120 operation performs substantially similar while minimizing eNB requirements.

Figure 17:
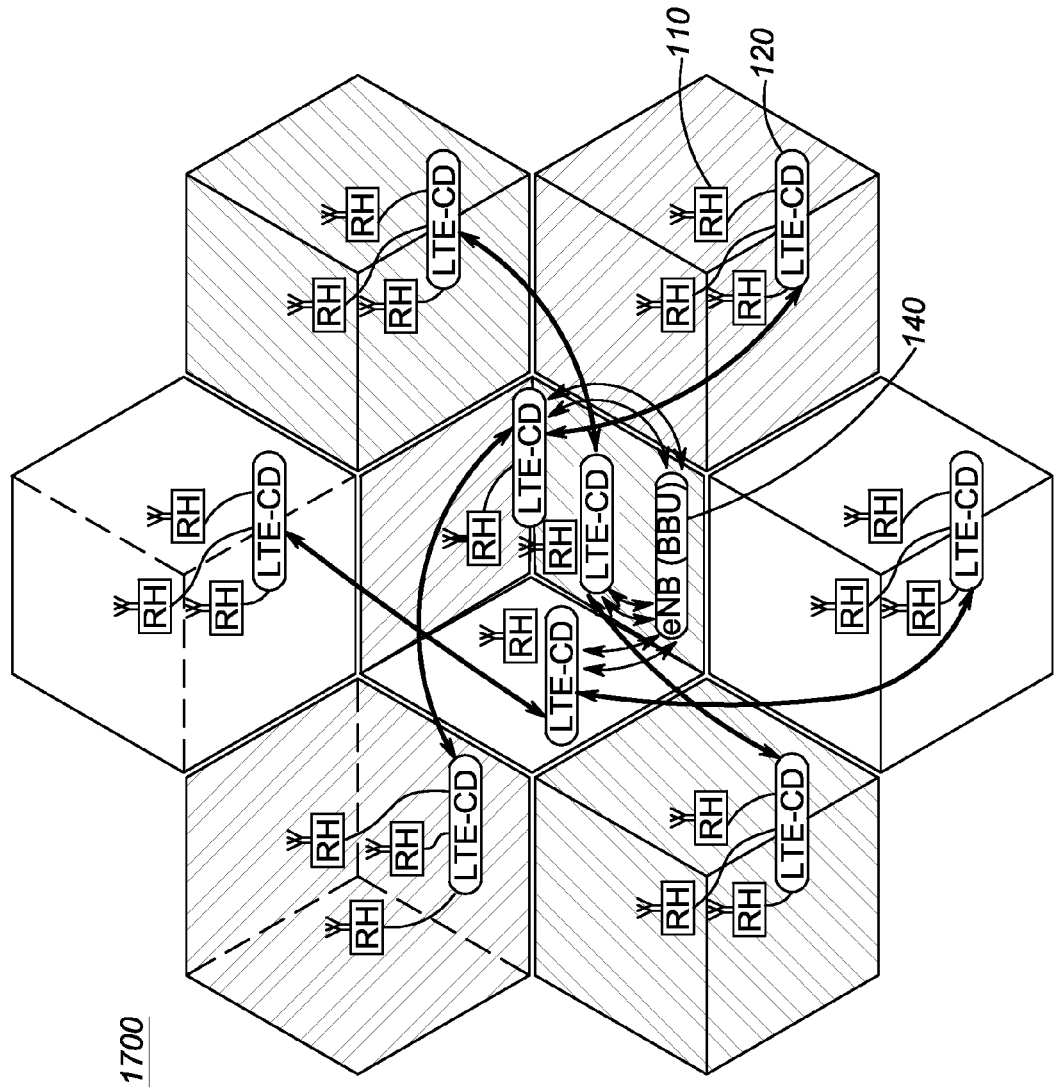
FIG. 17 is a network diagram of the network of FIG. 13 with re-arranged areas of the 3 sectors to be concentrated by the LTE-CD, such that a UE transition between sectors causes only a standard LTE sector hand-off instead of a timing jump that could degrade rate performance as in FIG. 13 in accordance with some embodiments.

FIG. 17 is a network diagram of a network 1700 for solving timing discontinuities while changing sectors in accordance with some embodiments. FIG. 17 is a network diagram of the network of FIG. 13 with re-arranged areas of the 3 sectors to be concentrated by the LTE-CD, such that a UE transition between sectors causes only a standard LTE sector hand-off instead of a timing jump that could degrade rate performance as in FIG. 13. The network 1700 includes multiple three sector macro cells as described in the network 1500. In the network 1700, the center cell is divided into split sectors (based on shading). The LTE-CDs 120 are configured to interface to WBRTs 110 (i.e., RHs) with the same shading to enable a standard hand-off when changing sectors without timing discontinuities. Rx/Tx diversity is maintained throughout the new sector and even increased between original cell edges within the new sector. The new inter-sector interference causes interfere on all the original cell edges (avoided by Inter-Cell Interference Coordination (ICIC)). Time offsets between sites are introduced and can be mitigated with Extended and Normal Cyclic Prefix (CP). PUCCH and PRACH with a direct sum approach suffers a noise figure degradation equivalent of 8.45 dB and non-standard propagation channel (same effect as downlink simulcast). Power control behaves as normal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

For example, LTE-CD 120 preferably comprises a processor, such as one or more microprocessors, microcontrollers, digital signal processors (DSPs), combinations thereof or such other devices known to those having ordinary skill in the art. The particular operations/functions of the processor, and thus of the LTE-CD, are determined by an execution of software instructions and routines that are stored in an at least one memory device of the LTE-CD that is associated with the processor, such as random access memory (RAM), dynamic random access memory (DRAM), and/or read only memory (ROM) or equivalents thereof, that maintains data and programs that may be executed by processor. For example, the processor of LTE-CD 120 may implement the functionality described herein as being performed by the LTE-CD 120, such as delay blocks 310, the processing block 320, the common processing block 330, and the processing block 340 described above, based software instructions and routines stored in the at least one memory device.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method to extend radio coverage in a cellular radio telephone Long Term Evolution (LTE) system, the method comprising:
    combining all uplink resource block signals received from a plurality of Wide Band Receiver Transmitter (WBRT) devices into a single uplink signal, wherein combining comprises:
        for a given user equipment (UE) and for each WBRT device of the plurality of WBRT devices, decomposing an uplink signal received from the UE via the WBRT device into a plurality of resource blocks;
        for each same resource block of the UE that is received from all of the plurality of WBRT devices, selecting a best resource block from among the resource blocks received from the plurality of WBRT devices, wherein selecting comprises selecting, for each Physical Uplink Shared Channel (PUSCH) resource block, a best received copy among all received from the plurality of WBRT devices based on resource block power or signal-to-noise ratio;
        combining the selected resource blocks into a single uplink signal;
    providing the single uplink signal to an eNodeB (eNB), wherein the plurality of WBRT devices extend coverage of the eNB; and
    providing a downlink signal from the eNB in simulcast to each of the plurality of WBRT devices.

2. The method of claim 1, further comprising:
    receiving the uplink resource block signals in baseband from each of the plurality of WBRT devices via a low delay communication link; and
    transmitting the downlink signal in simulcast and in baseband to each of the plurality of WBRT devices via the low delay communication link.

3. The method of claim 2, further comprising:
    utilizing a long Circular Prefix (CP) to accommodate delay introduced by the low delay communication link.

4. The method of claim 1, wherein providing the signal to the eNodeB comprises:
    providing the single uplink signal in baseband or a modulated radio frequency.

5. The method of claim 1, wherein selecting the best resource block comprises:
    selecting the best uplink resource block based on any of signal strength or Signal-to-Noise-and-Interference Ratio measured on a first symbol in an associated resource block.

6. The method of claim 1, further comprising:
    performing the combining comprising:
        summing Physical Random Access Channel (PRACH) and Physical Uplink Shared Channel (PUCCH) resource blocks from each of the plurality of WBRT devices without selection.

7. The method of claim 6, further comprising:
monitoring the downlink signal from the eNB to determine locations of the PRACH and PUCCH resource blocks.

8. The method of claim 1, further comprising:
communicating with the eNB via Long Term Evolution (LTE) compliant mechanisms thereby allowing the eNB to be a commercial off-the-shelf (COTS) system, wherein the LTE compliant mechanisms comprise one of receiver or transmitter antenna ports or a Common Public Radio Interface (CPRI).

9. The method of claim 1, further comprising:
performing the combining in a hierarchical fashion prior to performing the providing the single uplink signal to the eNB.

10. An apparatus for extending coverage in Long Term Evolution (LTE), the apparatus comprising:
a first LTE concentrator and distributor device configured to communicate to a plurality of Wide Band Receiver Transmitter (WBRT) devices, other LTE concentrator and distributor devices, and to an eNodeB (eNB), wherein the first concentrator and distributor device comprises:
a processor that is configured to:
combine all uplink resource block signals received from the plurality of WBRT devices or the other LTE concentrator and distributor devices into a single uplink signal, wherein combining comprises:
for a given user equipment (UE) and for each WBRT device of the plurality of WBRT devices, decomposing an uplink signal received from the UE via the WBRT device into a plurality of resource blocks;
for each same resource block of the UE that is received from all of the plurality of WBRT devices, selecting a best resource block from among the resource blocks received from the plurality of WBRT devices, wherein selecting the best resource block from among the resource blocks received from the plurality of WBRT devices comprises selecting the best resource block based on any of signal strength or Signal-to-Noise-and-Interference Ratio measured on a first symbol in an associated resource block;
combining the selected resource blocks into a single uplink signal;
provide the single uplink signal to the eNB, wherein the plurality of WBRT devices extend coverage of the eNB; and
provide a downlink signal from the eNB in simulcast to each of the plurality of WBRT devices or the other LTE concentrator and distributor devices.

11. The apparatus of claim 10, wherein the processor is configured to communicate with the eNB via Long Term Evolution (LTE) compliant mechanisms thereby allowing the eNB to be a commercial off-the-shelf (COTS) system, wherein the LTE compliant mechanisms comprise one of receiver or transmitter antenna ports or a Common Public Radio Interface (CPRI).

12. The apparatus of claim 10, further comprising:
a plurality of LTE concentrator and distributor devices each configured to communicate to some of the plurality of WBRT devices and to the first concentrator and distributor device, or to the eNB directly;
wherein the plurality of concentrator and distributor devices are configured to:
combine all uplink resource block signals received from associated WBRT devices or the other LTE concentrator and distributor devices into a single output signal; and
provide the single output signal to the first concentrator and distributor device, or to the eNB directly, wherein the first concentrator and distributor device and the plurality of concentrator and distributor devices are configured to operate in a hierarchical manner to form the single uplink signal.

13. The apparatus of claim 10, further comprising:
a low delay communication link between each of the plurality of WBRT devices, the other LTE concentrator and distributor devices, and the first concentrator and distributor device, wherein the low delay communication link is utilized for receiving the uplink resource block signals and transmitting the downlink signal by the first concentrator and distributor device.

14. The apparatus of claim 10, wherein the processor is configured to provide the single uplink signal to the eNB by providing the single uplink signal in baseband or a modulated radio frequency.

15. The apparatus of claim 10, wherein the processor is configured to sum Physical Random Access Channel (PRACH) and Physical Uplink Shared Channel (PUCCH) resource blocks from each of the plurality of WBRT devices or the other LTE concentrator and distributor devices without selection.

16. The apparatus of claim 15, wherein the processor is configured to monitor the downlink signal from the eNB to determine locations of the PRACH and PUCCH resource blocks.

17. A Long Term Evolution (LTE) network, comprising:
a Long Term Evolution (LTE) concentrator and distributor device communicatively coupled to an eNodeB (eNB);
a plurality of Wide Band Receiver Transmitter (WBRT) devices communicatively coupled to the LTE concentrator and distributor device;
another LTE concentrator and distributor device communicatively coupled to the LTE concentrator and distributor device;
a low delay communication link between the plurality of WBRT devices and the LTE concentrator and distributor device; and
another low delay communication link between the another LTE concentrator and distributor device and the LTE concentrator and distributor device;
wherein the LTE concentrator and distributor device is configured to combine all uplink resource block signals received from the plurality of WBRT devices and the another LTE concentrator and distributor device into a single uplink signal and wherein combining comprises:
for a given user equipment (UE) and for each WBRT device of the plurality of WBRT devices and the another LTE concentrator and distributor device, decomposing an uplink signal received from the UE via the WBRT device or the another LTE concentrator and distributor device into a plurality of resource blocks;
for each same resource block of the UE that is received from all of the plurality of WBRT devices and the another LTE concentrator and distributor device, selecting a best resource block from among the resource blocks received from the plurality of WBRT devices and the another LTE concentrator and distributor device, wherein selecting the best resource block from among the resource blocks received from the plurality of WBRT devices and the another LTE concentrator and distributor device comprises selecting the best resource block based on any of signal strength or Signal-to-Noise-and-Interference Ratio measured on a first symbol in an associated resource block;

combining the selected resource blocks into a single uplink signal;

wherein the plurality of WBRT devices extend geographical coverage of the eNB in a Public Safety LTE deployment or a sparsely populated commercial LTE deployment.

18. The LTE network of claim 17, wherein the at least one WBRT device is configured to:

communicate with user equipment (UE);

provide an uplink signal to the LTE concentrator and distributor device; and provide a downlink signal to the UE: and wherein the LTE concentrator and distributor device is configured to:

provide the single uplink signal to the eNB, wherein the at least one WBRT device extends coverage of the eNB and the at least one WBRT device is geographically deployed instead of a corresponding eNB; and provide a downlink signal from the eNB in simulcast to the at least one WBRT device.

* * * * *